United States Patent
Kanamori et al.

(10) Patent No.: US 8,249,370 B2
(45) Date of Patent: Aug. 21, 2012

(54) IMAGE PROCESSING METHOD, IMAGE RECORDING METHOD, IMAGE PROCESSING DEVICE AND IMAGE FILE FORMAT

(75) Inventors: Katsuhiro Kanamori, Nara (JP); Hiroyoshi Komobuchi, Kyoto (JP); Hideto Motomura, Nara (JP); Kenji Kondo, Kyoto (JP); Takeo Azuma, Kyoto (JP)

(73) Assignee: Panasonic Corporation, Osaka (JP)

( * ) Notice: Subject to any disclaimer, the term of this patent is extended or adjusted under 35 U.S.C. 154(b) by 527 days.

(21) Appl. No.: 12/612,351

(22) Filed: Nov. 4, 2009

(65) Prior Publication Data

US 2010/0046906 A1 Feb. 25, 2010

Related U.S. Application Data

(60) Division of application No. 11/789,010, filed on Apr. 23, 2007, now Pat. No. 7,636,393, which is a continuation of application No. PCT/JP2006/315655, filed on Aug. 8, 2006.

(30) Foreign Application Priority Data

Sep. 9, 2005 (JP) ................... 2005-262610

(51) Int. Cl.
*G06K 9/60* (2006.01)
(52) U.S. Cl. ................... 382/232; 375/240.12
(58) Field of Classification Search .................. 382/232; 375/240.12
See application file for complete search history.

(56) References Cited

U.S. PATENT DOCUMENTS

| | | | |
|---|---|---|---|
| 5,016,282 A | 5/1991 | Tomono et al. | |
| 5,103,306 A | 4/1992 | Weiman et al. | |
| 5,200,818 A | 4/1993 | Neta et al. | |
| 5,818,954 A | 10/1998 | Tomono et al. | |
| 6,677,979 B1 | 1/2004 | Westfield | |
| 6,701,017 B1 * | 3/2004 | Nagata et al. | 382/232 |
| 6,839,452 B1 | 1/2005 | Yang et al. | |
| 2002/0172434 A1 | 11/2002 | Freeman et al. | |
| 2005/0035314 A1 | 2/2005 | Yamaguchi | |
| 2006/0003328 A1 * | 1/2006 | Grossberg et al. | 435/6 |

(Continued)

FOREIGN PATENT DOCUMENTS

JP 7-143439 6/1995

(Continued)

OTHER PUBLICATIONS

Abe, Yoshito et al., "Edge Enhancement of Images Using Multiresolution Vector Quantization," IEICE Transactions, vol. J79-A 1996, No. 5, pp. 1032-1040, May 1996, and a partial English translation thereof.

(Continued)

*Primary Examiner* — Sath V Perungavoor
*Assistant Examiner* — Jeffery Williams
(74) *Attorney, Agent, or Firm* — Harness, Dickey & Pierce, P.L.C.

(57) ABSTRACT

A recording process records low-resolution video data while obtaining a high-resolution image in a window region being a portion of an entire image. Then, the process learns, as a resolution conversion rule, a resolution increasing parameter by using the high-resolution image. In a resolution increasing process, the resolution of the recorded low-resolution video data is increased by using the resolution increasing parameter learned in the recording process.

13 Claims, 33 Drawing Sheets

U.S. PATENT DOCUMENTS

2006/0115176 A1    6/2006    Kanamori et al.

FOREIGN PATENT DOCUMENTS

| JP | 8-130678 A | 5/1996 |
| JP | 2000-32318 | 1/2000 |
| JP | 3240339 | 10/2001 |
| JP | 2003-18398 A | 1/2003 |
| JP | 2003-219346 A | 7/2003 |
| JP | 2003-302211 A | 10/2003 |
| JP | 2004-021388 A | 1/2004 |
| JP | 2004-120341 A | 4/2004 |
| JP | 2004-518312 A | 6/2004 |
| JP | 2005-90958 A | 4/2005 |
| JP | 2005-522108 A | 7/2005 |
| WO | 02/05208 A2 | 1/2002 |
| WO | 03/084207 | 10/2003 |
| WO | 2005/122089 A1 | 12/2005 |

OTHER PUBLICATIONS

Umeyama, Shinji, "Separation of Diffuse and Specular Components of Surface Reflection—Using Multiple Observations Through a Polarizer and Probabilistic Independence Property," Symposium on Image Recognition and Understanding 2002, pp. I-469-I-476, and a partial English translation thereof.

* cited by examiner

FIG.10
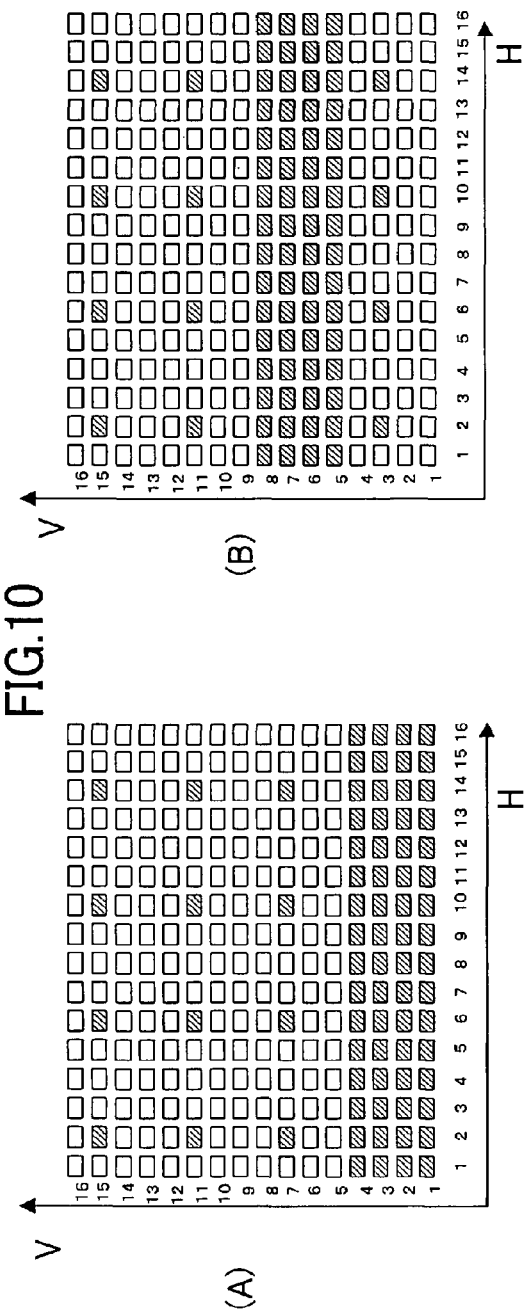
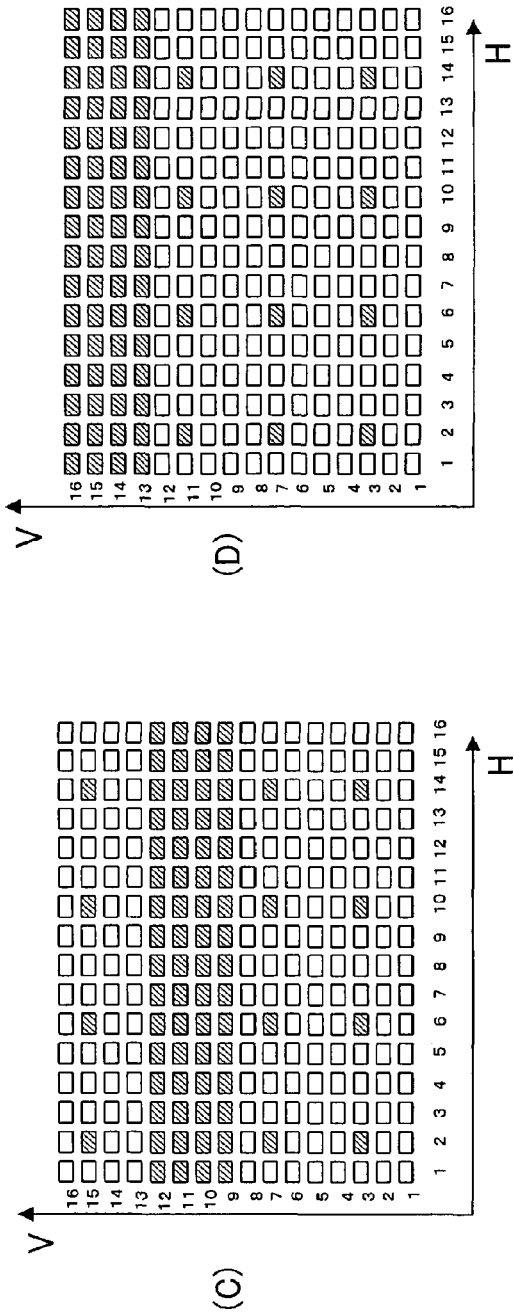

FIG.29
(A)
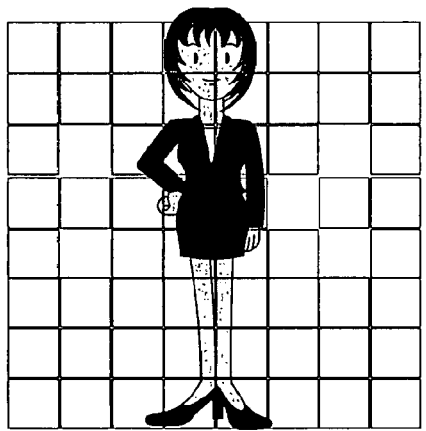
(B)
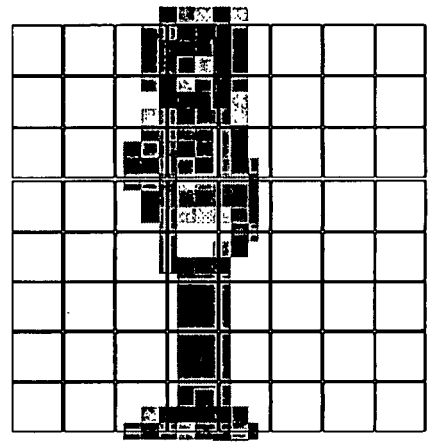
(C)
Object candidate region
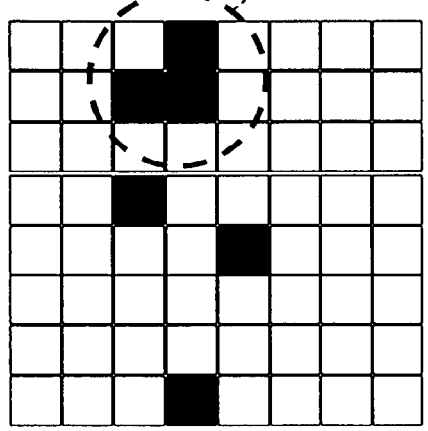
(D)
High-resolution window region
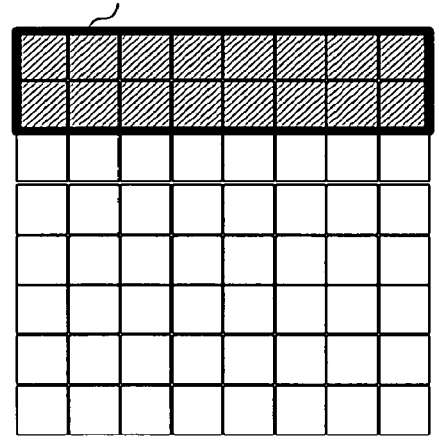

IMAGE PROCESSING METHOD, IMAGE RECORDING METHOD, IMAGE PROCESSING DEVICE AND IMAGE FILE FORMAT

CROSS-REFERENCE TO RELATED APPLICATIONS

This application is a divisional of U.S. patent application Ser. No. 11/789,010 filed on Apr. 23, 2007 which is a continuation of International Application PCT/JP2006/315655, filed on Aug. 8, 2006. This Non-provisional application claims priority under 35 U.S.C. §119(a) on Patent Application No. 2005-262610 filed in Japan on Sep. 9, 2005, the entire contents of which are hereby incorporated by reference.

BACKGROUND OF THE INVENTION

1. Field of the Invention

The present invention relates to an image processing technique, and more particularly to a technique for resolution conversion such as increasing the resolution of video data.

2. Description of the Background Art

With the spread of digital image devices such as digital video cameras and digital still cameras, it has become common that high-resolution digital images are handled by various types of input/output devices. Particularly, with still images, the image pick-up device of an ordinary consumer digital still camera has five megapixels or more, and some products include an image pick-up device having over ten megapixels. It can be said that sufficiently high resolutions have been realized for digital photography applications.

As the demands for higher resolutions for still images have been quite satisfied, it is now expected in the field of digital image applications that there will be more demands for higher resolutions for video data, particularly, for video data such as movies where each frame image is of such a high resolution that it can be used as a good-quality still image. There are two fields of application to which image resolution increasing techniques are applied, i.e., image input systems such as cameras and image display systems such as TV sets. The present invention is directed primarily to image input systems.

Increasing the resolution of video data in an image input system involves the following problem. Where video data of an HD (High Definition) TV or better quality is desired, it is very difficult to read out all pixels at a video data frame rate of about 30 fps due to the large number of pixels even if the image pick-up device has enough pixels. If such a high-speed read-out process is performed forcibly, the equipment will consume excessive power and generate excessive heat. Therefore, with state-of-the-art techniques, it is difficult to record video data with a high resolution every frame, and it is possible only to obtain a high-resolution image per a few frames of video data. Researches have been made for the use of various image processing techniques after images are recorded.

More specifically, a conventional technique in the subject field is for obtaining video data of a high resolution in both the time and space domains from video data that has a high resolution in the time domain but a low resolution in the space domain, by using images that have a low resolution in the time domain but a high resolution in the space domain.

Patent Document 1 (Japanese Patent No. 3240339) discloses a technique for producing high-resolution video data based on low-resolution video data and high-resolution still images that are being recorded. With the technique of Patent Document 1, high-resolution still images are associated with samples of frames of low-resolution video data with a predetermined sampling interval therebetween so as to spatially compensate for the low-resolution video data to thereby increase the resolution of the video data.

Patent Document 2 (Japanese National Phase PCT Laid-Open Publication No. 2005-522108) discloses a technique as follows. A scene is recorded to produce low-quality image data while a portion of the scene is recorded to produce high-quality image data. Then, the high-quality image data and the low-quality image data are used as a learning pair in a learning algorithm to thereby determine quality-improving function parameters, based on which the high-quality image of the rest of the scene is derived.

However, the conventional techniques have the following problems.

The technique disclosed in Patent Document 1 is to produce video data of a high resolution in the space domain based on video data of a low resolution. Specifically, video data and still images are associated with each other at discrete points along the time axis, and therefore information for frames with which still images have already been associated is used for video data frames of which there is no association information. Then, similar signal level edges are searched for, which if found are considered to indicate translation-like movement of an object. Then, a motion vector searching process is used to determine the pixels to be compensated for in the space domain. The problem is that the searching process imposes a heavy load, and it may result in incorrect pixel associations. If the object deforms or turns simultaneously with its movement, the process may not find points to be associated with each other, whereby the process fails.

With the technique of Patent Document 1, the high-resolution image and the low-resolution image are read out at the same speed. If the resolution conversion factor between the video data and the still images is up to about two (i.e., two horizontally and two vertically), the process of reading out high-resolution images does not take excessive amounts of time. However, if the conversion factor is increased to about four, the total area of a high-resolution image to be read out is 16 times as great as that of a low-resolution image, and the process of reading out high-resolution images will take excessive amounts of time. As a result, there will be a significant increase in the number of frames to be dropped from the recorded video data, and the quality is likely to deteriorate due to the frame dropping in the video data.

With the technique of Patent Document 2, the position where the high-quality image data is recorded is fixed, for example, substantially at the center of the scene. Therefore, the quality-improving function parameters are determined based on the image characteristics at the fixed position. Thus, high-quality images may not be derived appropriately if the image characteristics at the fixed position are different from those of other positions. This presents a significant problem especially when increasing the resolution of video data, whereby it is likely that a sufficient precision will not be obtained in the resolution conversion.

SUMMARY OF THE INVENTION

It is an object of the present invention to realize an image process for increasing the resolution of video data, wherein a high-precision resolution conversion is realized even with a high resolution conversion factor of about four or more, for example.

According to the present invention, in a recording process of recording low-resolution video data, a high-resolution image is obtained every frame in the window region being a portion of the entire image. Then, the process learns a resolution conversion rule by using the high-resolution image in the window region. The position of the window region is changed every frame. In the resolution increasing process, the resolution of the recorded low-resolution video data is increased by using the resolution conversion rule learned in the recording process.

According to the present invention, a high-resolution image is obtained only for the window region being a portion of the entire image, whereby the pixel read-out process does not require a long period of time. Therefore, it is possible to record the low-resolution video data without dropping frames. Since the high-resolution image is obtained for each frame, the high-resolution image is not shifted in time with respect to the low-resolution image, thus allowing for the process to appropriately learn the resolution conversion rule. Since the position of the window region changes every frame, the resolution conversion rule is learned based on data from a large area of the image, but not data from a limited area of the image. Thus, the process can appropriately learn the resolution conversion rule. Moreover, the high-resolution image does not need to be stored, and only the low-resolution video data and the resolution conversion rule need to be stored, whereby it is possible to considerably reduce the amount of information to be stored as compared with conventional techniques. In the resolution increasing process, the resolution conversion rule, which is learned for the window region being a portion of the entire image, is used for the entire image of the recorded low-resolution video data. Unless the image characteristics of the object in the window region are significantly different from those outside the window region, it is possible to realize a high-precision resolution conversion across the entire image.

In the present invention, the process may produce the low-resolution image in the window region through an image filtering process such as sub sampling or averaging on the high-resolution image. Then, it is not necessary to read out the low-resolution image for the window region, and it is therefore possible to further reduce the total number of pixels that need to be read out.

In the present invention, the window region may be moved every frame so that the entire image is scanned by the window region over a plurality of frames. Then, the process learns the resolution conversion rule for the entire image over a plurality of frames, thus realizing the resolution increasing process with an even higher precision.

Thus, according to the present invention, it is possible to appropriately learn the resolution conversion rule and to realize a resolution conversion with a high precision. Moreover, the pixel read-out process does not take a long period of time, whereby the low-resolution video data can be recorded without dropping frames. Moreover, since it is not necessary to store the high-resolution image, it is possible to significantly reduce the amount of information to be stored. Therefore, it is possible to realize a high-precision resolution conversion even with a high resolution conversion factor of about four or more, for example.

The present invention is not limited to resolution increasing processes, but is applicable to resolution conversions in general. The present invention can also be effectively used in producing a low-resolution image to be displayed on a low-resolution display system such as a mobile telephone, for example.

BRIEF DESCRIPTION OF THE DRAWINGS

FIGS. 10A to 10D show an exemplary method for reading out pixels by a multi-pixel-resolution image pick-up device.

FIGS. 29A to 29D show a process of detecting an object candidate region according to the fifth embodiment of the present invention.

DETAILED DESCRIPTION OF THE PREFERRED EMBODIMENTS

Figure 1:
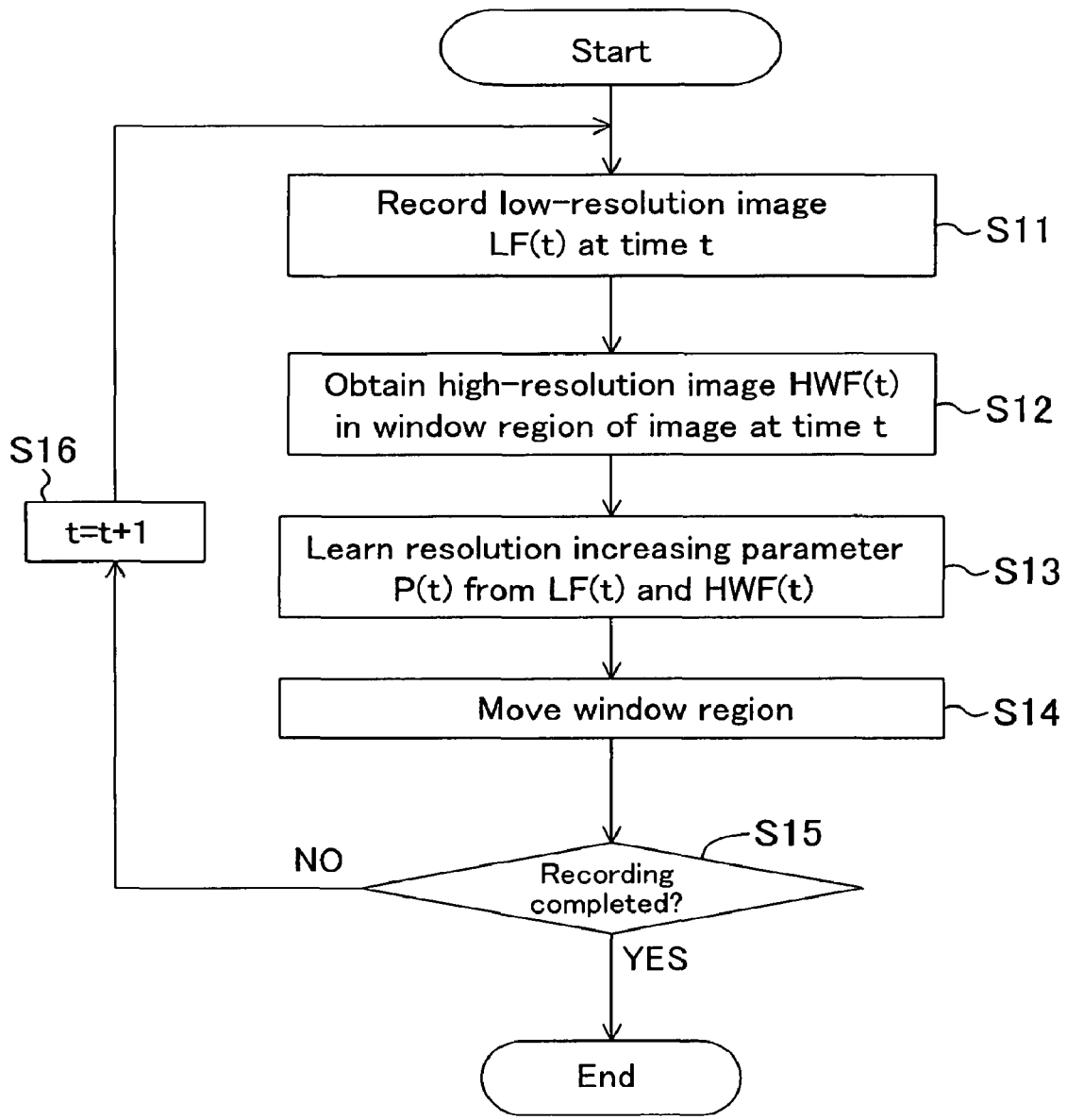
FIG. 1 is a flow chart showing a recording process in an image processing method according to a first embodiment of the present invention.

A first aspect of the present invention is directed to an image processing method, including: a recording process of recording low-resolution video data; and a resolution increasing process of increasing a resolution of the low-resolution video data recorded in the recording process, wherein: the recording process includes: a step of obtaining, in each frame of the low-resolution video data, a high-resolution image in a window region being a portion of an entire image; and a step of learning, in each frame, a resolution conversion rule by using the high-resolution image in the window region; the resolution increasing process includes a step of increasing a resolution of the low-resolution video data by using the resolution conversion rule learned in the recording process; and in the recording process, a position of the window region is changed every frame.

A second aspect of the present invention is directed to the image processing method of the first aspect, wherein: the recording process obtains multi-pixel-resolution video data by taking an image with a high resolution in the window region and an image with a low resolution outside the window region; and with the multi-pixel-resolution video data, the recording process performs an image filtering process on the high-resolution image in the window region to produce the low-resolution video data.

A third aspect of the present invention is directed to the image processing method of the second aspect, wherein in the recording process: a motion of an object candidate region is detected in the low-resolution video data; and a position of the window region is moved according to the detected motion of the object candidate region.

A fourth aspect of the present invention is directed to the image processing method of the second aspect, wherein in the recording process: the multi-pixel-resolution video data is obtained while being split into a diffuse reflection component and a specular reflection component; and the low-resolution video data and the resolution conversion rule are obtained separately for the diffuse reflection component and for the specular reflection component.

A fifth aspect of the present invention is directed to the image processing method of the first aspect, wherein the resolution conversion rule describes a correlation between texture feature vectors of images of different resolutions.

A sixth aspect of the present invention is directed to the image processing method of the first aspect, wherein the resolution increasing process is performed for a subject frame by using the resolution conversion rule learned in at least one frame preceding or following the subject frame, in addition to the resolution conversion rule leaned in the subject frame.

A seventh aspect of the present invention is directed to the image processing method of the first aspect, wherein in the recording process, the window region is moved every frame so that an entire image is scanned by the window region over a plurality of frames.

An eighth aspect of the present invention is directed to the image processing method of the seventh aspect, wherein the window region is one of n regions (n is an integer of two or more) into which an entire image is divided, and the window region is moved so that the entire image is covered by the window region over n frames.

A ninth aspect of the present invention is directed to the image processing method of the eighth aspect, wherein the resolution increasing process is performed for a subject frame by using the resolution conversion rules learned for n frames including the subject frame, and by using, for each portion corresponding to the window regions of the n frames, the resolution conversion rule for the frame corresponding to the portion.

A tenth aspect of the present invention is directed to the image processing method of the first aspect, wherein in the window region, the resolution increasing process synthesizes together an original high-resolution image and an image obtained by the resolution increasing process with a predetermined synthesis ratio.

An eleventh aspect of the present invention is directed to an image recording method, including a step of obtaining and recording multi-pixel-resolution video data by taking an image with a high resolution in a window region being a portion of an entire image while taking an image with a low resolution outside the window region, wherein a position of the window region is changed every frame in the step.

A twelfth aspect of the present invention is directed to an image processing device, including: a multi-pixel-resolution image pick-up section for obtaining multi-pixel-resolution video data by taking an image with a high resolution in a window region being a portion of an entire image and whose position changes every frame while taking an image with a low resolution outside the window region; a downward resolution conversion section for performing an image filtering process on the high-resolution image in the window region to decrease a resolution of the high-resolution image; a low-resolution video recording section for recording low-resolution video data obtained from an output of the downward resolution conversion section and the multi-pixel-resolution video data; a resolution increasing parameter learning section for learning a resolution increasing parameter by using the high-resolution image in the window region and the output of the downward resolution conversion section; and a resolution increasing parameter recording section for recording the resolution increasing parameter.

A thirteenth aspect of the present invention is directed to the image processing device of the twelfth aspect, wherein the multi-pixel-resolution image pick-up section obtains the multi-pixel-resolution video data while the multi-pixel-resolution video data is split into a luminance component and a color difference component.

A fourteenth aspect of the present invention is directed to the image processing device of the twelfth aspect, further including a record button, wherein when the record button is pressed, the multi-pixel-resolution image pick-up section records an image, and the low-resolution video data and the resolution increasing parameter are recorded.

A fifteenth aspect of the present invention is directed to the image processing device of the twelfth aspect, further including a window position updating section for detecting a motion of an object candidate region in the low-resolution video data and moving a position of the window region according to the detected motion of the object candidate region.

A sixteenth aspect of the present invention is directed to the image processing device of the fifteenth aspect, wherein the window position updating section detects the object candidate region based on a frequency analysis of an image.

A seventeenth aspect of the present invention is directed to the image processing device of the twelfth aspect, wherein the multi-pixel-resolution image pick-up section obtains the multi-pixel-resolution video data while the multi-pixel-resolution video data is split into a diffuse reflection component and a specular reflection component.

An eighteenth aspect of the present invention is directed to the image processing device of the seventeenth aspect, wherein the multi-pixel-resolution image pick-up section splits a taken color image into a plurality of primary color components and splits one of the primary color components into a specular reflection component and a diffuse reflection component, and wherein a diffuse reflection component and a specular reflection component of the color image are obtained by using the obtained specular reflection component and diffuse reflection component.

A nineteenth aspect of the present invention is directed to the image processing device of the seventeenth aspect, wherein the multi-pixel-resolution image pick-up section estimates illuminating light used for recording, and the specular reflection component is obtained by using the estimated illuminating light.

A twentieth aspect of the present invention is directed to an image processing device for performing a resolution increasing process by using the low-resolution video data and the resolution increasing parameter recorded by the image processing device of the twelfth aspect, the image processing device including: a video input section for reading the low-resolution video data; a resolution increasing parameter input section for reading the resolution increasing parameter; and a resolution increasing section for increasing a resolution of the low-resolution video data read by the video input section by using the resolution increasing parameter read by the resolution increasing parameter input section.

A twenty-first aspect of the present invention is directed to an image processing device, including: a multi-pixel-resolution image pick-up section for obtaining multi-pixel-resolution video data by taking an image with a high resolution in a window region being a portion of an entire image and whose position changes every frame while taking an image with a low resolution outside the window region; a downward resolution conversion section for performing an image filtering process on the high-resolution image in the window region to decrease a resolution of the high-resolution image; a multi-pixel-resolution video recording section for recording the multi-pixel-resolution video data; a resolution increasing parameter learning section for learning a resolution increasing parameter by using the high-resolution image in the window region and the output of the downward resolution conversion section; and a resolution increasing parameter recording section for recording the resolution increasing parameter.

A twenty-second aspect of the present invention is directed to the image processing device of the twenty-first aspect, wherein the multi-pixel-resolution video recording section records the multi-pixel-resolution video data while the multi-pixel-resolution video data is split into low-resolution video data and differential video data representing a difference between the multi-pixel-resolution video data and the low-resolution video data.

A twenty-third aspect of the present invention is directed to an image processing device, including: a multi-pixel-resolution image pick-up section for obtaining multi-pixel-resolution video data by taking an image with a high resolution in a window region being a portion of an entire image and whose position changes every frame while taking an image with a low resolution outside the window region; and a multi-pixel-resolution video recording section for recording the multi-pixel-resolution video data while the multi-pixel-resolution video data is split into low-resolution video data and differential video data representing a difference between the multi-pixel-resolution video data and the low-resolution video data.

A twenty-fourth aspect of the present invention is directed to an image processing device for obtaining a resolution increasing parameter by using multi-pixel-resolution video data recorded by the image processing device of the twenty-third aspect, the image processing device including: a video separation section for reading the multi-pixel-resolution video data and separating the low-resolution video data therefrom and for obtaining the high-resolution image in the window region by using the differential video data; a resolution increasing parameter learning section for learning a resolution increasing parameter by using the high-resolution image in the window region and the low-resolution video data; and a resolution increasing parameter recording section for recording the resolution increasing parameter.

A twenty-fifth aspect of the present invention is directed to an image file format for video data, wherein: for each frame, a resolution in a window region being a portion of an entire image is higher than that outside the window region; a position of the window region changes every frame.

A twenty-sixth aspect of the present invention is directed to the image file format of the twenty-fifth aspect, wherein a diffuse reflection component and a specular reflection component are stored separately.

A twenty-seventh aspect of the present invention is directed to an image file format representing video data in which a resolution in a window region being a portion of an entire image is higher than that outside the window region in each frame, wherein data of the image file format includes first compressed data obtained by compressing low-resolution video data having the resolution outside the window region and second compressed data obtained by compressing differential video data, the differential video data representing the difference between the video data and the low-resolution video data, and wherein a position of the window region changes every frame.

Preferred embodiments of the present invention will now be described in detail with reference to the drawings.

First Embodiment

Figure 2:
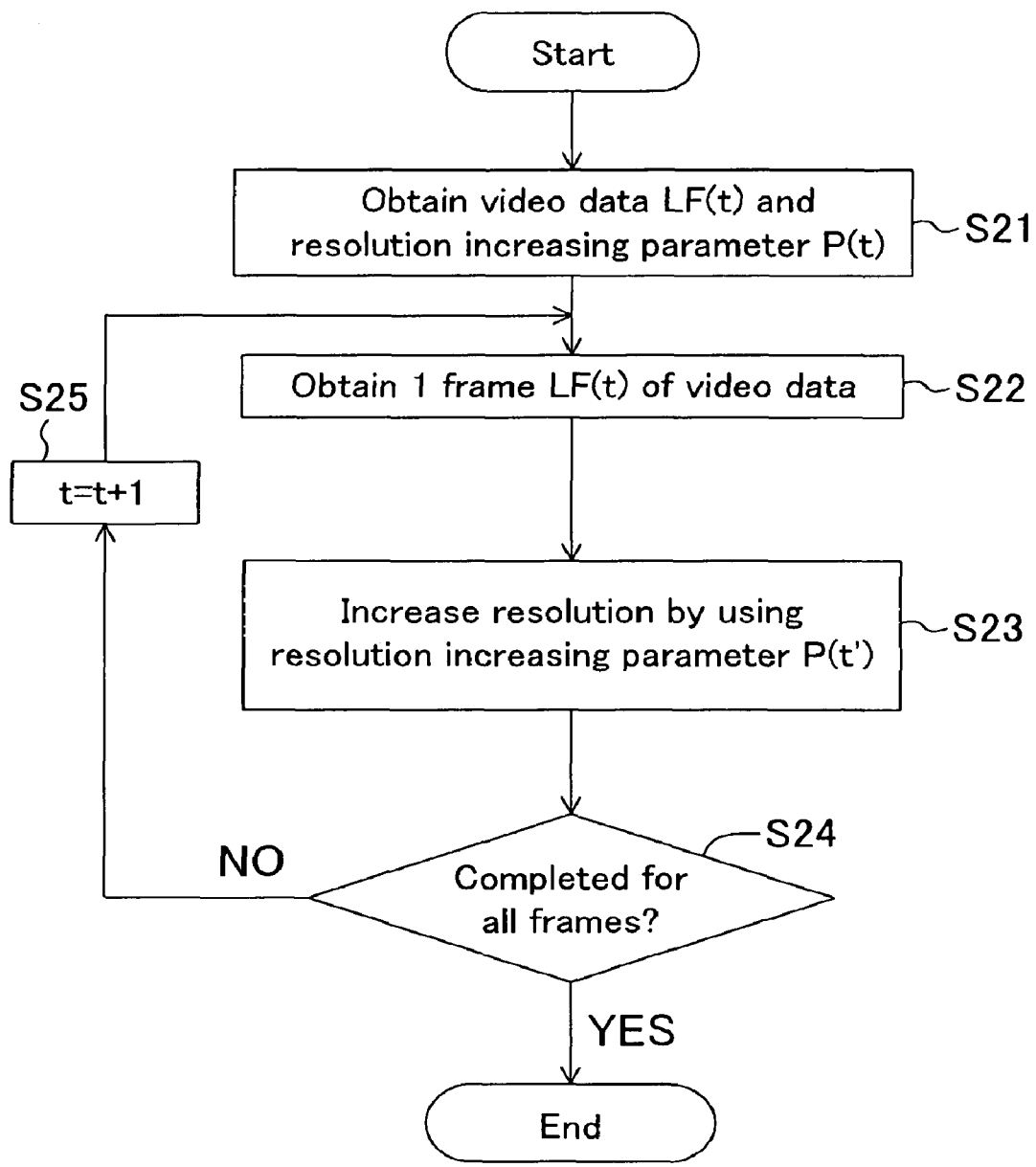
FIG. 2 is a flow chart showing a resolution increasing process in the image processing method according to the first embodiment of the present invention.

FIGS. 1 and 2 are flow charts showing an image processing method according to a first embodiment of the present invention. FIG. 1 shows a recording process of recording a scene, and FIG. 2 shows a resolution increasing process of reproducing and displaying the recorded video data. The process of FIG. 1 and that of FIG. 2 correspond to the video recording process and the reproduction process of watching the recorded video on a display, respectively.

The recording process of FIG. 1 first obtains and stores a low-resolution image LF(t) at time t (S11). At the same time, the process obtains a high-resolution image HWF(t) in a window region being a portion of the image frame (S12). Since the high-resolution image HWF(t) is only used in a later process, it does not need to be stored as video data. Based on these images LF(t) and HWF(t) of different resolutions, the process learns and stores a resolution increasing parameter P(t) as a resolution conversion rule (S13). Then, the window region is moved to another position (S14). If the recording has not been completed, control proceeds to the next process at time t+1 (S16). If the recording has been completed, the process ends (S15).

In step S13, the process obtains the texture feature for each of the low-resolution image LF(t) and the high-resolution image HWF(t), and parameterize the correlation between the texture feature quantities. The parameter P(t) is herein referred to as the "resolution increasing parameter". Essentially, the parameter is a function or table as shown below for outputting a high-resolution texture TFH in response to an input low-resolution texture TFL.

$$TFH = \text{Function}(TFL, t) \quad \text{Exp. 1}$$

The resolution increasing parameter is used as the resolution conversion rule.

In the resolution increasing process of FIG. 2, the process obtains low-resolution video data LF(t) recorded in the recording process, and the resolution increasing parameter P(t) learned in the recording process (S21). Then, the process obtains a frame of video data (S22), and performs the resolution increasing process for that frame by using the resolution increasing parameter (S23). If the process is completed for all the frames, the process ends (S24). Otherwise, the process proceeds to the next frame (S25).

In step S23, it is preferred that the resolution increasing process is performed by using not only the resolution increasing parameter learned in that frame but also those learned in at least one frame before or after the current frame. This is because the resolution increasing parameter for the current frame is learned only for a window region being a portion of the image, and may not therefore be sufficient for increasing the resolution of the entire image. For example, the process may use a resolution increasing parameter P(t') for a period of time from t−T to t+T, where T is a predetermined amount of time, as shown in the expression below.

$$t-T \leq t' \leq t+T \quad \text{Exp. 2}$$

Figure 3:
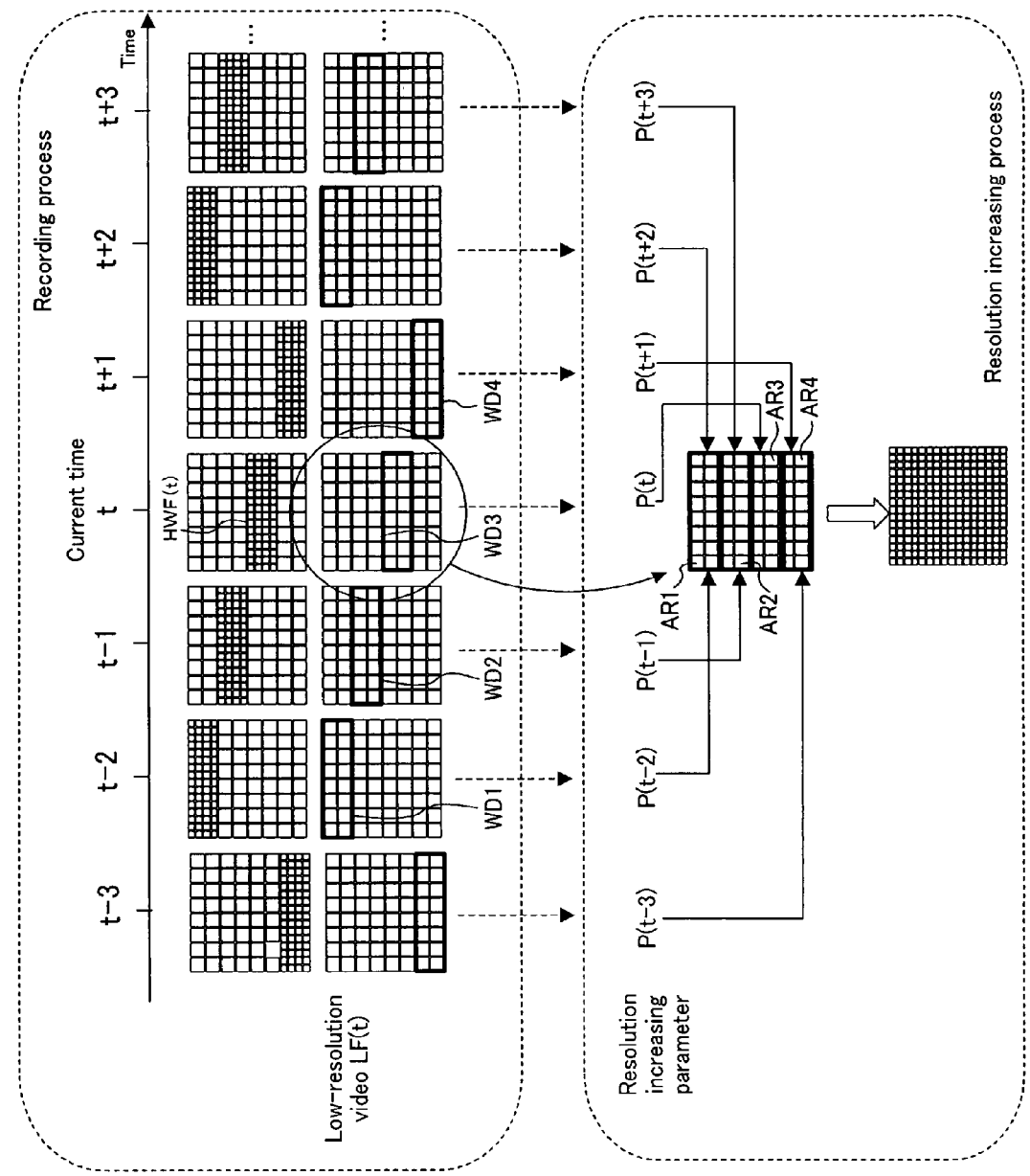
FIG. 3 is a conceptual diagram showing an example of a recording process and a resolution increasing process according to the first embodiment of the present invention.

FIG. 3 conceptually shows an example of a recording process and a resolution increasing process according to the present embodiment. In FIG. 3, each frame of the low-resolution video data LF(t) is an 8×8-pixel image, and is divided into four window regions WD1 to WD4. The position of the window region changes every frame. In the illustrated example, the window region is gradually moved in the vertical scanning direction, i.e., from the top down to the bottom position and then back up to the top position. While the shape and the movement of the window region are simple in the illustrated example for ease of understanding, they are not limited to those of the illustrated example.

Within the window region (WD1 to WD4), the image is recorded with a higher resolution than outside the window region to obtain the high-resolution image HWF(t). It is assumed herein that the image is recorded in the window region with a pixel resolution 2×2 times as high as that outside the window region. The process may obtain video data where different pixel resolutions coexist in the same frame by recording the image with a high resolution within the window region and with a low resolution outside the window region as will be described later. Such video data is herein referred to as "multi-pixel-resolution video data".

With such multi-pixel-resolution video data, a low-resolution image is recorded outside the window region, but only a high-resolution image is recorded within the window region. Note however that it is not necessary to re-record a low-resolution image in the window region, which can be produced by performing an image filtering process such as sub sampling or averaging on the high-resolution image. The modeling can be made more realistic by taking into consideration the optical system and the aperture shape of the image pick-up device. For example, the conversion can be done by applying a PSF (Point Spread Function) to the high-resolution image as a convolution calculation with a Gaussian function, and then integrating the obtained result over a range of the image pick-up device region having a two-dimensionally constant width.

At the current point in time t, four areas AR1 to AR4 (arranged vertically with one another) of the image correspond to the window region WD1 at time t−2, the window region WD2 at time t−1, the window region WD3 at time t, and the window region WD4 at t−3, respectively. Thus, at time t, the resolution increasing parameters for the areas AR1 to AR4 have already been learned at times t−2, t−1, t and t−3, respectively. With a video data frame rate of 1/30 (sec), the length of time from t−3 to t is only about 1/10 sec. Therefore, unless there is a very sudden change of scene, substantially the same feature information is obtained in each of these frames. Thus, it is effective to use the resolution increasing parameters from time t−3 to time t.

Moreover, any low-resolution image region at time t is always recorded with a high resolution at:
time t−1 or t+3;
time t−2 or t+2; or
time t−3 or t+1.

Therefore, where resolution increasing parameters from t−3 to t+3 are used, the resolution increasing process is effective unless there is a very sudden change of scene within the time frame. This is equivalent to setting T=3 in Expression 2 above.

Assume resolution increasing parameters P(t−3), P(t−2), . . . are given at corresponding points in time as shown in FIG. 3. In the resolution increasing process, the resolution of each area in each frame of the low-resolution video data can be increased by using the resolution increasing parameter of a frame that is close in time to the subject frame and at which the window region corresponds to the position of the subject area. For example, with an image LF(t) at time t, the resolution increasing parameters P(t−2), P(t−1), P(t) and P(t+1) can be used for the areas AR1, AR2, AR3 and AR4, respectively. Alternatively, the resolution increasing parameter P(t+2) may be used for the area AR1, and the resolution increasing parameter P(t+3) for the area AR2.

While FIG. 3 shows an example where the frame is divided into four window regions, the entire image may be divided into n window regions (where n is an integer of two or more), wherein the window region is moved so that the entire image is scanned across over n frames. Also with other methods, it is preferred that the window region is moved so that the entire image is scanned across over a plurality of frames.

Figure 4:
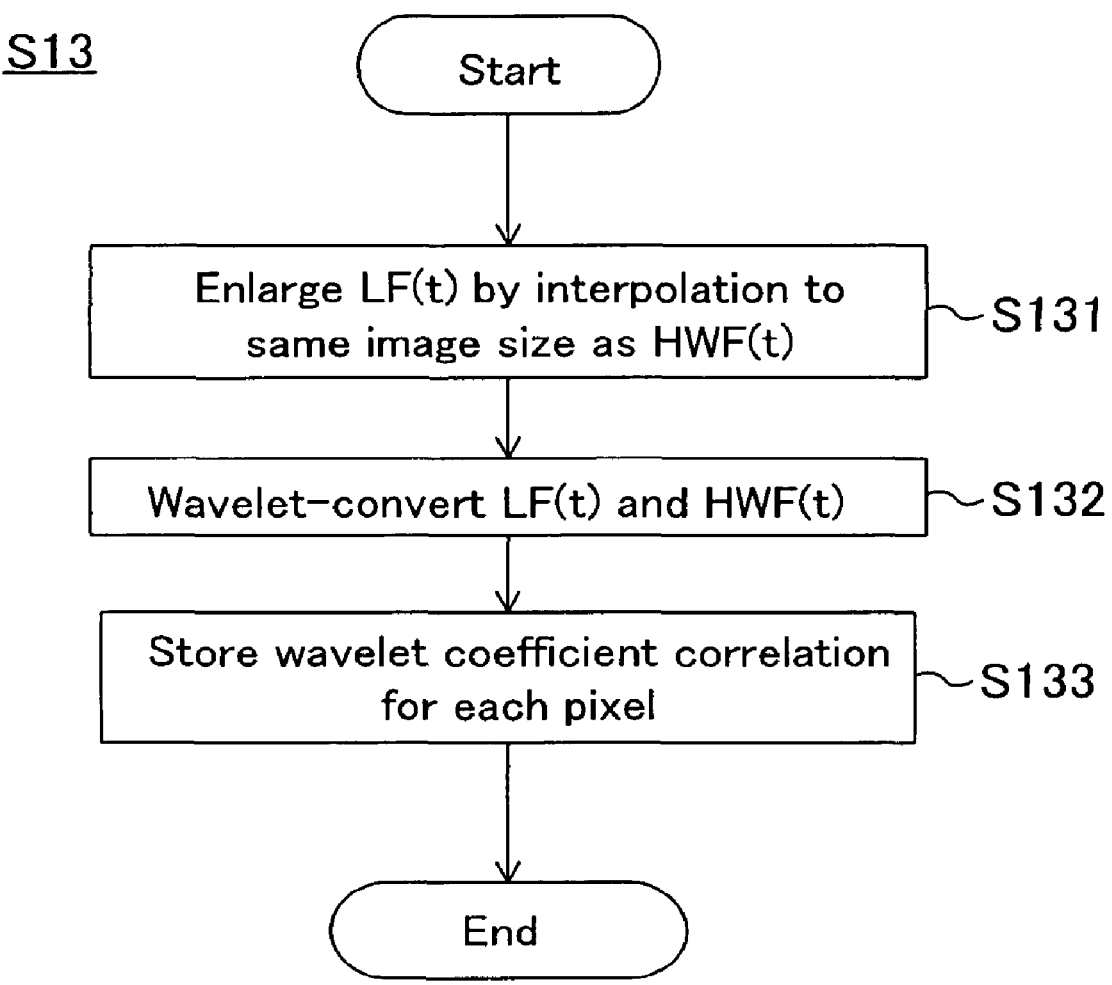
FIG. 4 is a flow chart showing an example of a process in step S13 of FIG. 1.

FIG. 4 is a flow chart showing an example of the process in step S13 of FIG. 1. This is an exemplary method for converting an image to a texture feature vector, wherein resolution increasing parameters are learned using the multi-resolution analysis based on the wavelet transform. First, the low-resolution image LF(t) is enlarged by interpolation so as to match the image size of the low-resolution image LF(t) with that of the high-resolution image HWF(t) (S131). Then, the two images LF(t) and HWF(t) are transformed by a wavelet transform using three-step scaling process to be described later (S132). Finally, the correlation between the wavelet coefficients of the two images LF(t) and HWF(t) is stored for each pixel position (S133). The correlation is the resolution increasing parameter P(t).

Figure 5:
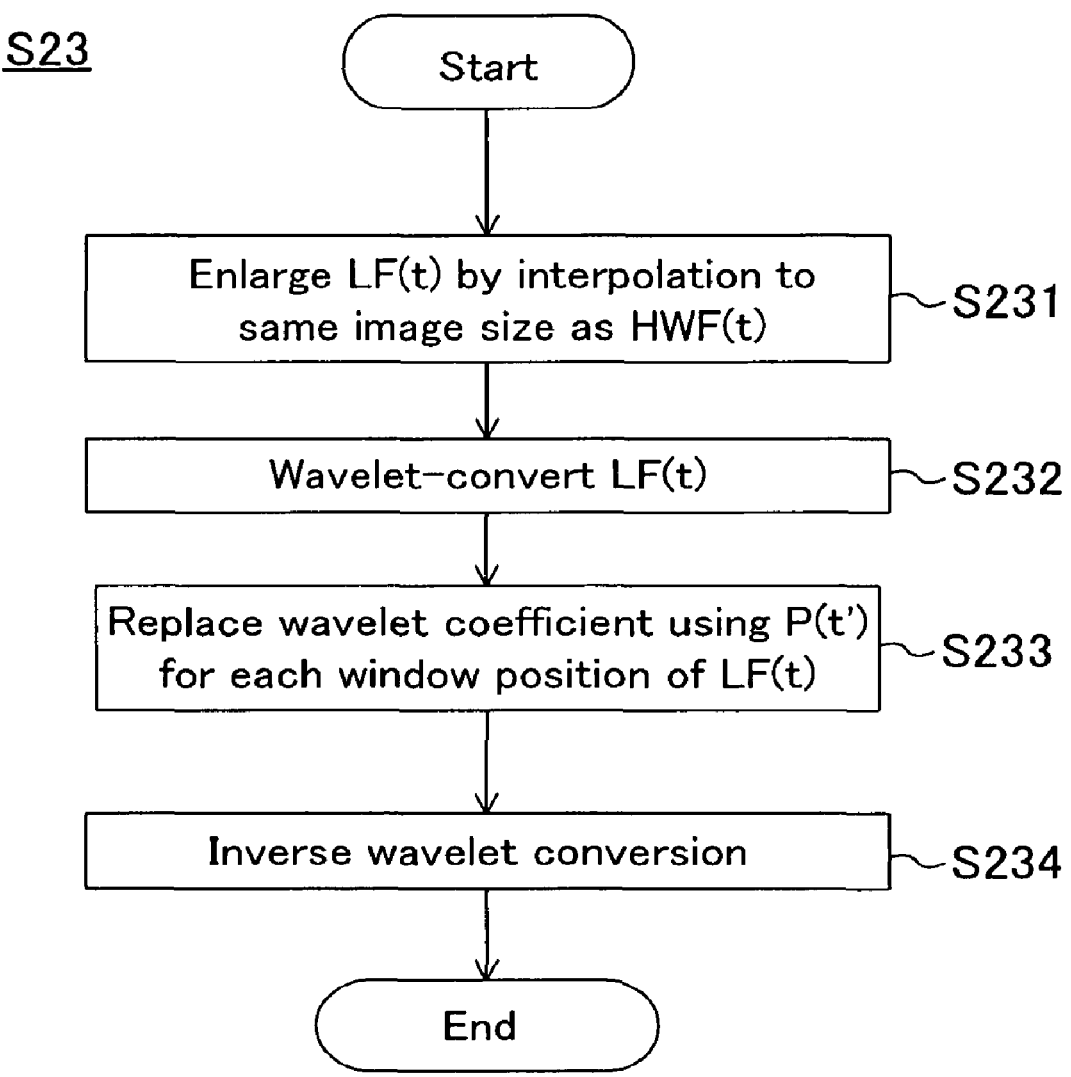
FIG. 5 is a flow chart showing an example of a process in step S23 of FIG. 2.

FIG. 5 is a flow chart showing an example of a process in step S23 of FIG. 2. Herein, a resolution increasing process is performed by using the resolution increasing parameter P(t') for a period of time. First, the low-resolution image LF(t) is enlarged by interpolation to match the image size thereof with that of the high-resolution image HWF(t) (S231). Then, the low-resolution image LF(t) is wavelet-transformed (S232), and the wavelet coefficient is replaced by using the resolution increasing parameter P(t') (S233). Then, an inverse wavelet transform is performed to covert the image to a high-resolution image (S234). In step S233, a resolution increasing parameter from a different frame time may be used for a portion of the entire image as described above with reference to FIG. 3. Alternatively, resolution increasing parameters over a period of time may be quantized into a single set, which can be used as the resolution increasing parameter.

Figure 6:
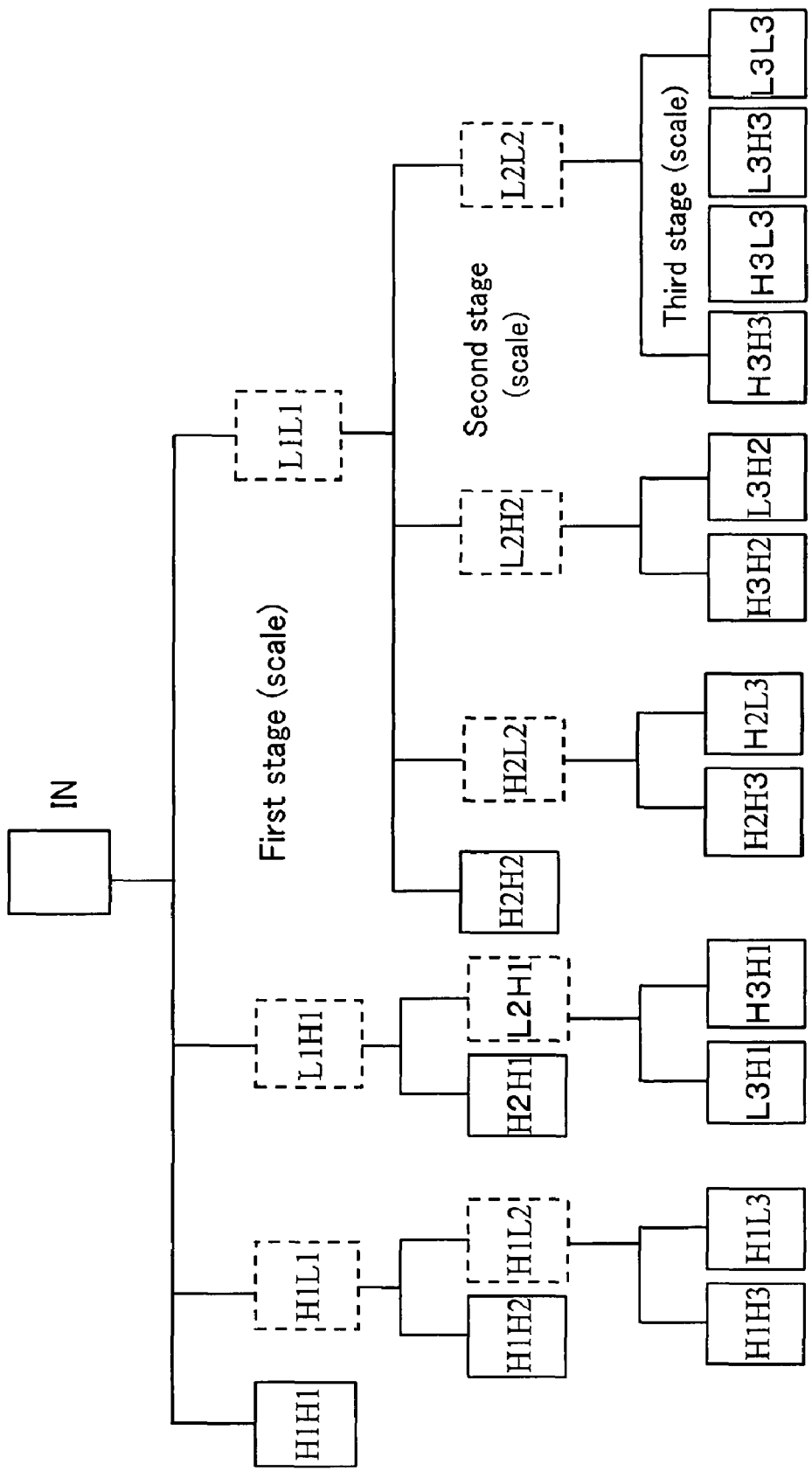
FIG. 6 shows an exemplary method for conversion to a texture feature in step S132 of FIG. 4.

FIG. 6 shows an example of the wavelet transform in step S132 of FIG. 4. Referring to FIG. 6, in the first stage (scale), an input image IN is subjected to a wavelet transform in the X direction and in the Y direction to be decomposed into four component images H1H1, H1L1, L1H1 and L1L1 of the same size as the input image IN. In the second stage (scale), the components other than the component H1H1, which is the high-frequency component both in the X and Y directions, are further decomposed. Only the component L1L1 is again decomposed both in the X direction and in the Y direction, whereas the other components H1L1 and L1H1 are decomposed only in one direction, thus resulting in a total of eight components. In the third stage (scale), the components other than the components H1H2, H2H1 and H2H2 are decomposed similarly, wherein only the component L2L2 is decomposed both in the X and Y directions, whereas the other components are decomposed only in one direction, thus resulting in a total of 12 components. Those that are re-decomposed into two or four as the scale increases (those shown in dotted lines) can be produced by subsequent synthesis.

Figure 7:
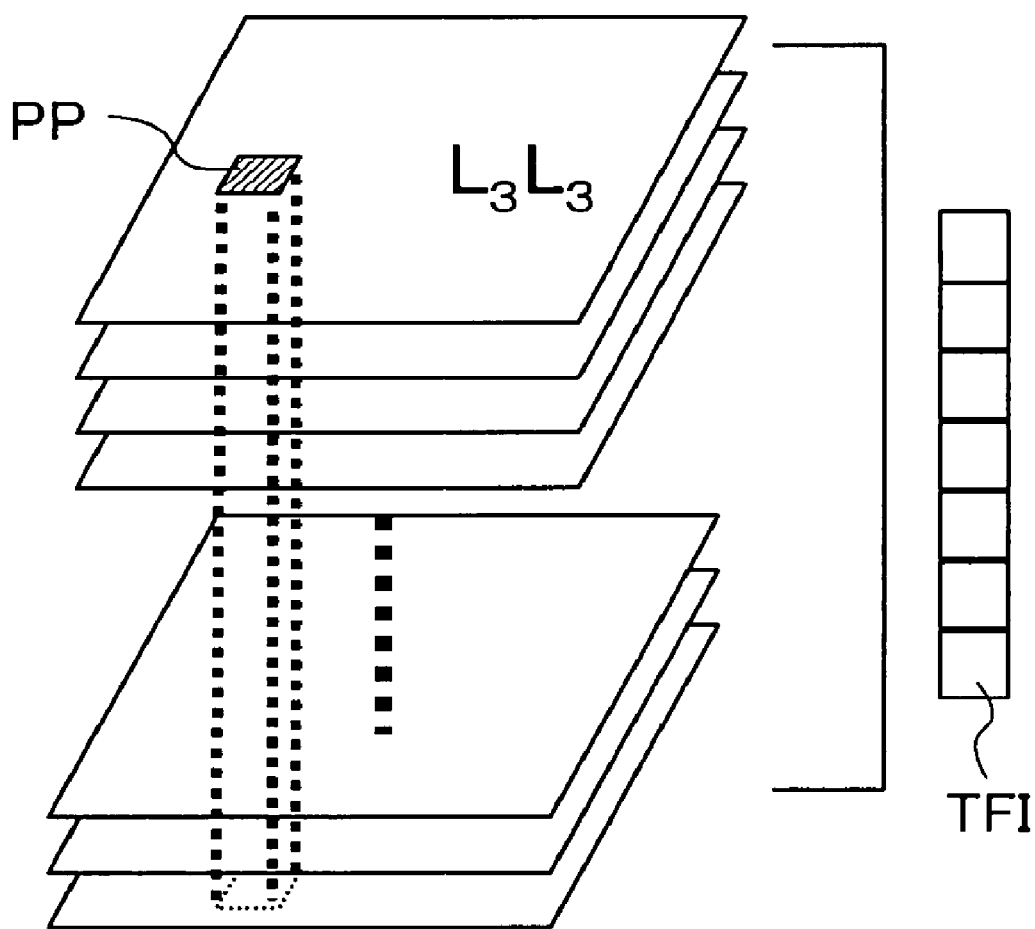
FIG. 7 shows a converted texture feature.

Through the wavelet transform decomposition as shown in FIG. 6, each pixel of the input image IN is decomposed into 16 components as shown in FIG. 7. A vector obtained by combining together these 16 components is a texture feature TF1 at a pixel position PP.

As described above, the low-resolution image and the high-resolution image are each converted to a texture feature, and the correlation between the texture feature quantities is learned so as to produce an analysis code book and a reproduction code book. This process is described in detail in, for example, Yoshito Abe, Hisakazu Kikuchi, Shigenobu Sasaki, Hiromichi Watanabe and Yoshiaki Saitoh "Edge enhancement of images using multiresolution vector quantization", IEICE Transactions, Vol. J79A 1996/5 (pp. 1032-1040). In such a case, the parameterization in step S13 corresponds to the production of an analysis code book and a reproduction code book. The resolution increasing parameter P(t) shown in Expression 1 above is calculated from this.

In the present embodiment, a high-resolution image is obtained only in a window region being a portion of the image during the recording operation, and a resolution increasing parameter is produced by using an image feature such as a texture. Employment of such a process has the following advantages.

Firstly, instead of obtaining the resolution increasing parameter in a preliminary learning process from different video data, the resolution increasing parameter can be learned for the object itself of video data to be later subjected to the resolution increasing process, whereby it is possible to realize a high-precision image process. Moreover, since the resolution increasing parameter is a function of time, if it is learned for each frame, it is possible to instantaneously obtain an optimal resolution increasing parameter irrespective of the characteristics of an object appearing in the screen. Thus, in principle, there is no performance deterioration due to the difference in characteristics between the resolution increasing parameter obtained by a learning process and video data whose resolution is actually increased.

Secondly, what is used in the resolution increasing process is a feature such as the image texture, and has no direct correlation with the position in the screen, whereby it is not substantially influenced by the movement of the window region across the screen. Therefore, by appropriately moving the window to cover the entire image, it is possible to sufficiently use information from the entire image.

While the recording process shown in FIG. 1 and the resolution increasing process shown in FIG. 2 are typically performed sequentially in this order, the recording process and the resolution increasing process may be performed in parallel in time in a case where the camera recording process and the transmission/display process are performed at the same time as in a live broadcast.

In the present embodiment, only the low-resolution video data is recorded in the recording process, whose resolution is then increased in a resolution increasing process. Alternatively, for example, multi-pixel-resolution video data as shown in FIG. 3 may be recorded, whose resolution can later be increased in a resolution increasing process.

Second Embodiment

A second embodiment of the present invention is based on the first embodiment as described above, and is directed to a specific device configuration. In this embodiment, the recording process is performed by using a camcorder including a multi-pixel-resolution image pick-up section capable of recording multi-pixel-resolution video data as described above. The multi-pixel-resolution image pick-up section is realized by using an XY address type imaging device such as a CMOS-type image pick-up sensor.

Figure 8:
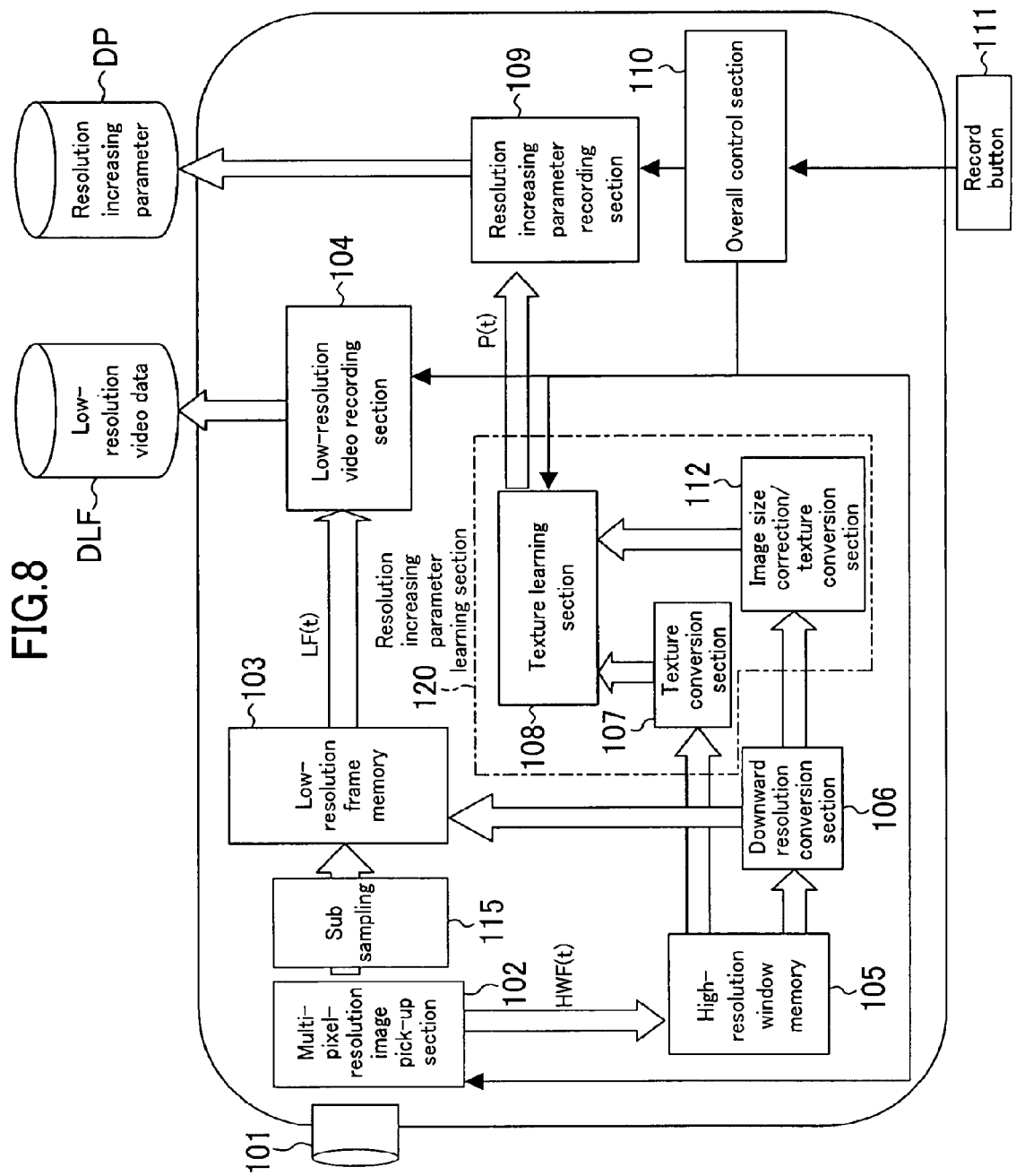
FIG. 8 shows an exemplary configuration of an image processing device according to a second embodiment of the present invention.

FIG. 8 is a block diagram showing an exemplary configuration of an image processing device of the present embodiment, wherein the present invention is applied to a camcorder. An image processing device 10 of FIG. 8 includes a lens 101, a multi-pixel-resolution image pick-up section 102, a low-resolution frame memory 103 for storing one frame LF(t) of low-resolution video data, a low-resolution video recording section 104 for recording low-resolution video data DLF, a high-resolution window memory 105 for storing the high-resolution image HWF(t) in the window region in one frame, a downward resolution conversion section 106 for performing an image process to convert the high-resolution image HWF(t) in the window region to a lower resolution, a resolution increasing parameter learning section 120 for learning the resolution increasing parameter P(t) by using the high-resolution image HWF(t) in the window region, a resolution increasing parameter recording section 109 for recording a resolution increasing parameter DP, an overall control section 110, and a record button 111. The resolution increasing parameter learning section 120 includes a texture conversion section 107 for converting the high-resolution image HWF(t) to a texture feature, an image size correction/texture conversion section 112 for correcting the pixel size of the low-resolution image and then converting it to a texture, and a texture learning section 108 for learning the texture correlation. Since the multi-pixel-resolution image pick-up section 102 herein reads out signals line by line, a sub sampling circuit 115 for performing a horizontal pixel sub sampling process is provided between the multi-pixel-resolution image pick-up section 102 and the low-resolution frame memory 103.

When the record button 111 is pressed, the overall control section 110 sends out a record command to the multi-pixel-resolution image pick-up section 102 and the low-resolution video recording section 104. When the record command is received, the multi-pixel-resolution image pick-up section 102 performs the recording process, wherein the low-resolution image LF(t) is stored in the low-resolution frame memory 103 for each frame. Then, the low-resolution video recording section 104 produces video data by chronologically combining together the low-resolution images LF(t) stored in the low-resolution frame memory 103, and further performs processes such as a data compressing process to obtain the low-resolution video data DLF, which is recorded on a storage medium or a network.

Simultaneously with the record command, the overall control section 110 sends out a learning signal to the texture learning section 108 and the resolution increasing parameter recording section 109. The high-resolution image HWF(t) in the window region obtained by the multi-pixel-resolution image pick-up section 102 is stored in the high-resolution window memory 105, and is input to the texture learning section 108 via the texture conversion section 107. The high-resolution image HWF(t) is input to the texture learning section 108 also via the image size correction/texture conversion section 112 after being subjected to the downward resolution conversion by the downward resolution conversion section 106. The texture learning section 108 learns the resolution increasing parameter P(t), being a resolution conversion rule, by associating together textures from images of the same point in time but of different resolutions. The resolution increasing parameter recording section 109 stores the parameter as the resolution increasing parameter DP, or sends out the parameter to a network.

The output of the downward resolution conversion section 106 is also supplied to the low-resolution frame memory 103. This is for filling the window region portion, which is missing in the low-resolution image LF(t), because the multi-pixel-resolution image pick-up section 102 obtains only the high-resolution image but does not read out the low-resolution image in the window region.

This operation is stopped when the record button 111 is released.

In the configuration of FIG. 8, sections from the multi-pixel-resolution image pick-up section 102 to the low-resolution video recording section 104 can be implemented by hardware, for example, and the texture learning section 108 and the resolution increasing parameter recording section 109 can be implemented primarily based on a CPU or GPU (Graphic Processing Unit).

Figure 9:
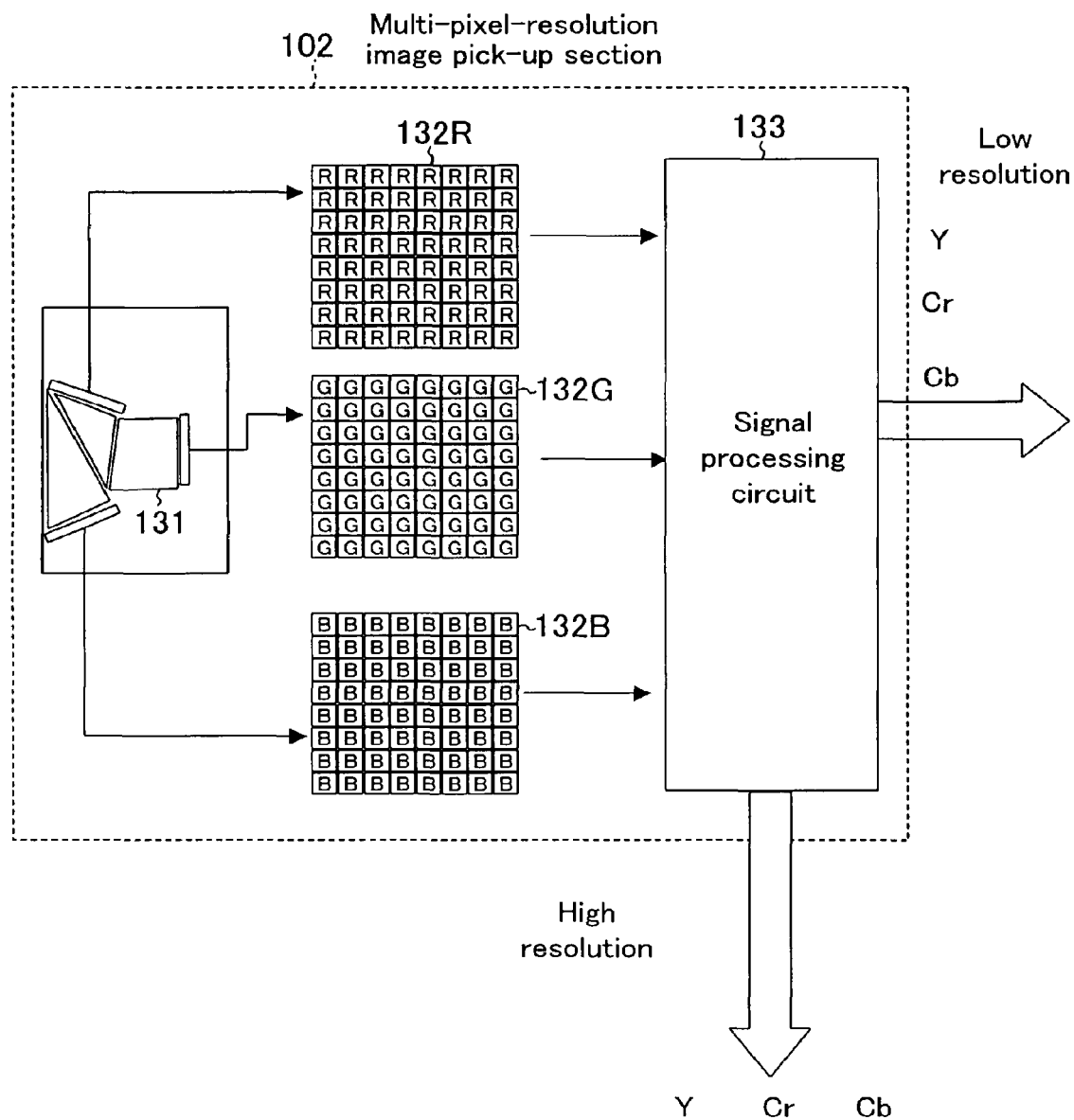
FIG. 9 is a conceptual diagram showing an exemplary configuration of a multi-pixel-resolution image pick-up section in FIG. 8.
Figure 11:
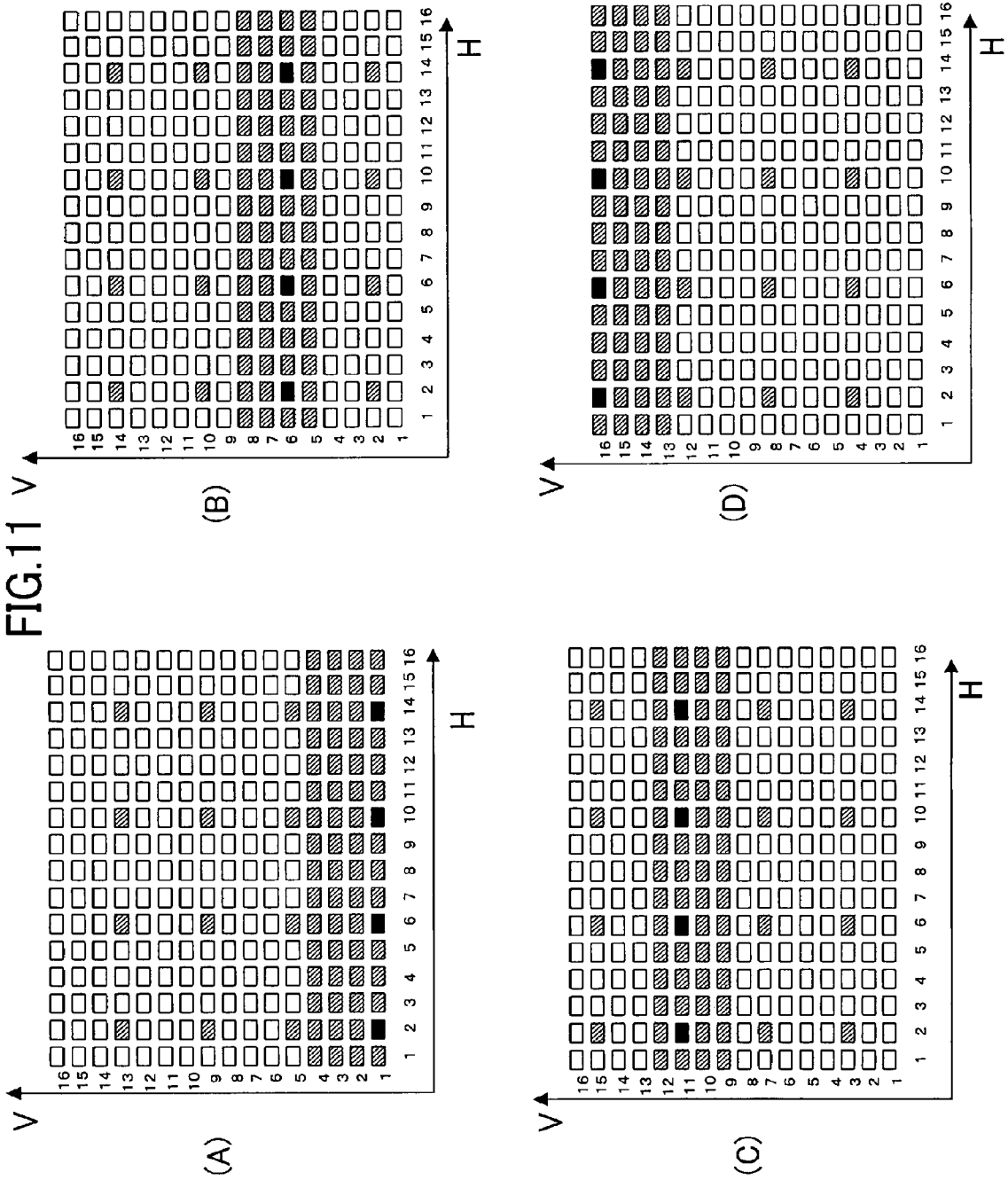
FIGS. 11A to 11D show an exemplary method for reading out pixels by a multi-pixel-resolution image pick-up device.

FIG. 9 is a conceptual diagram showing an exemplary configuration of the multi-pixel-resolution image pick-up section 102. The configuration of FIG. 9 employs an ordinary three-chip optical system for color image recording used in a camcorder. With a three-chip system, a dichroic prism 131 splits light into three wavelength bands of red (R), green (G) and blue (B). These color bands are assigned multi-pixel-resolution image pick-up devices 132R, 132G and 132B, respectively. A signal processing circuit 133 processes the outputs from the multi-pixel-resolution image pick-up devices 132R, 132G and 132B to produce the luminance signal Y and the color difference signals Cr and Cb. In this process, a low-resolution signal obtained by a "skip read-out operation" to be described later and a high-resolution signal obtained by a "progressive read-out operation" also to be described later are output separately.

Video data is recorded in the YCrCb format. For texture learning, the luminance-color difference signals may be all used in the YCrCb format, or only the luminance Y signal may be used. However, where the resolution increasing factor is greater than 4×4, the resolution increasing process using only the luminance Y results in an insufficient image quality in view of the frequency response characteristics for the luminance component and those for the color component of the human visual system, whereby it is necessary to perform the resolution increasing process separately for the color difference CrCb. Therefore, for a factor of 4×4 or more, three signal components of red R, green G and blue B may be used for the texture learning. In the configuration of FIG. 9, red, green and blue are assigned the multi-pixel-resolution image pick-up devices 132R, 132G and 132B, respectively, and the video data recording format is set to the conventional luminance-color difference space, whereby the luminance signal Y and the two color difference signals Cr and Cb are used independently for the texture learning.

FIGS. 10A to 10D show an example of read-out pixel positions for a multi-pixel-resolution image pick-up device. In FIGS. 10A to 10D, hatched pixels are pixels to be read out. While a practical image pick-up device has about 2000×3000 pixels, the figure shows a 16×16-pixel two-dimensional sensor, i.e., 16 vertical lines and 16 horizontal lines. FIGS. 10A to 10D show four frames that are contiguous in time.

As can be seen from FIGS. 10A to 10D, the 256 (=16×16) pixel region is divided into a region where all pixels are to be read out (corresponding to the window region in which the high-resolution image is obtained) and another region where a skip read-out operation is performed. The upward movement of the window region as shown in FIGS. 10A to 10D is repeated, in which each cycle is made up of the four frames of FIGS. 10A to 10D.

The method for obtaining a low-resolution image outside the window region may be any of various methods applicable. In the illustrated example, each read-out pixel position of the low-resolution image is at about the center of one of 16 virtual blocks into which the entire image is equally divided. This method produces a low-resolution image that has been sub sampled to ¼ in the horizontal (H) direction and in the vertical (V) direction. The vertical line numbers to be read out in the skip read-out operation are (7,11,15) in FIG. 10A, (3,11, 15) in FIG. 10B, (3,7,15) in FIG. 10C and (3,7,11) in FIG. 10D.

As described above, the window region where all lines are read out is regularly moved in the vertical direction by four lines, whereas three fixed lines in the vertical directions are read out outside the window region. With this method, it is possible to perform the multi-pixel-resolution recording operation without reading out the same pixel twice. This read-out method is used in the present embodiment.

FIGS. 11A to 11D show another example of read-out pixel positions used by the multi-pixel-resolution image pick-up device. The example shown in FIGS. 11A to 11D differs from that shown in FIGS. 10A to 10D in the method for reading out the low-resolution image. With this method, a ¼-sub sampled low-resolution image is read out at a different position for each frame, independently of the operation of reading out all lines in the window region. The purpose of this method is to equalize the sampling in the time and space domains, and allows for some pixels to be read out more than once. The vertical line numbers to be read out in the skip read-out operation are (1,5,9,13) in FIG. 11A, (2,6,10,14) in FIG. 11B, (3,7,11,15) in FIG. 11C and (4,8,12,16) in FIG. 11D. Pixels shown in solid black are those that are read out more than once. With this method, the low-resolution video data can be obtained only with pixels read out in the skip read-out operation. Therefore, it is not necessary to supply the pixel values from the downward resolution conversion section 106 to the low-resolution frame memory 103 in order to fill the window region mixing in the low-resolution image.

Configuration of Multi-Pixel-Resolution Image Pick-Up Device

Figure 12:
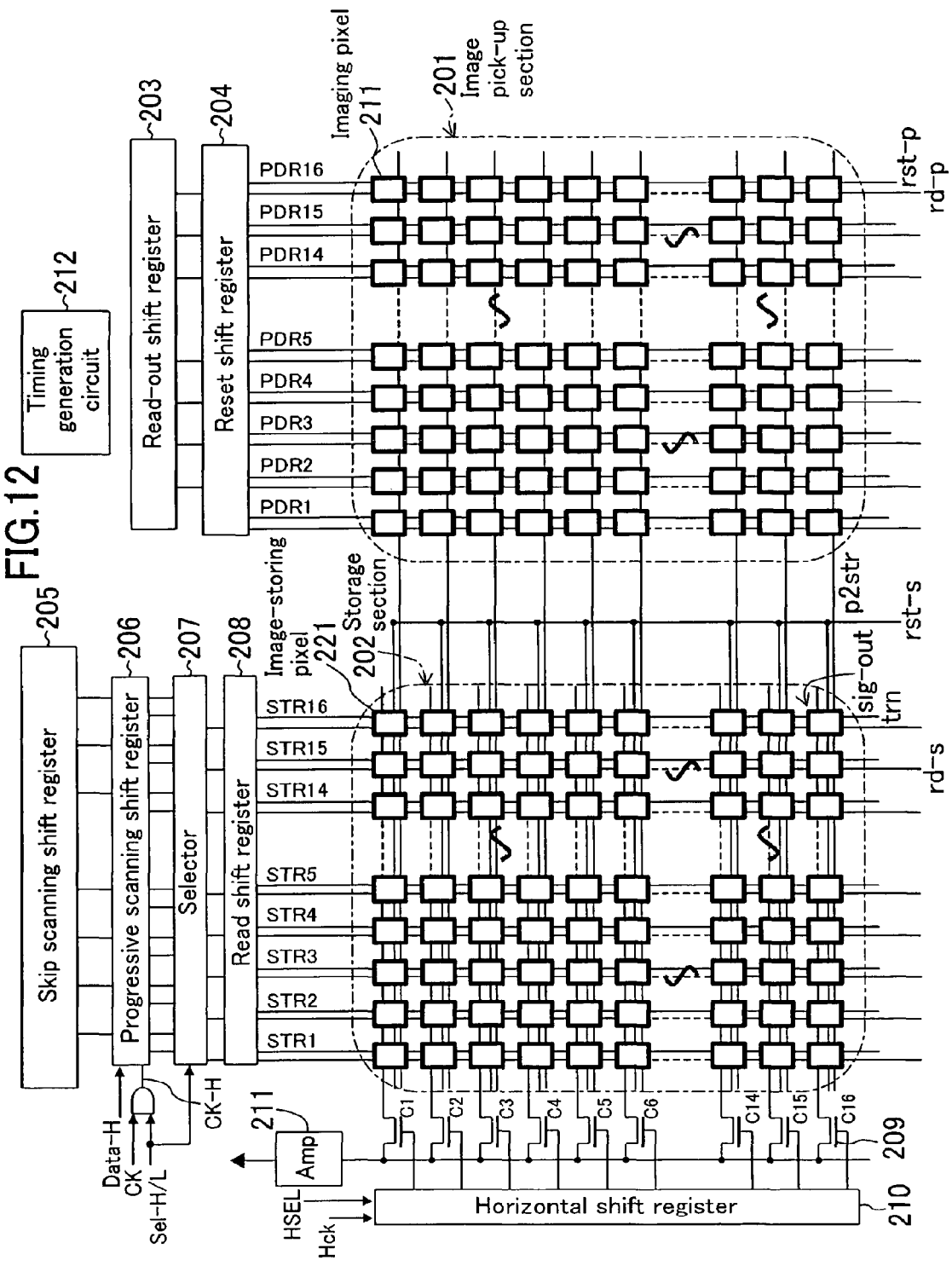
FIG. 12 shows an exemplary circuit configuration of a multi-pixel-resolution image pick-up device.

FIG. 12 is a circuit block diagram showing an exemplary configuration of the multi-pixel-resolution image pick-up device. FIG. 12 shows, as an example, a two-dimensional sensor with 16 vertical lines and 16 horizontal lines, capable of implementing a read-out method as shown in FIGS. 11A to 11D. In the following description, terms based on lines are used, and a process of reading out a portion of the screen with a high resolution is referred to as the "progressive read-out operation" whereas a process of reading out the screen with a low resolution is referred to as the "skip read-out operation".

Generally, the image pick-up device includes an image pick-up section 201 and a storage section 202. The image pick-up section 201 includes imaging pixels 211 capable of photoelectric conversion of the incident light, which are arranged in a two-dimensional arrangement (array). The storage section 202 includes image-storing pixels 221 including a light-blocking portion for blocking the incident light, which are arranged in a two-dimensional arrangement, each image-storing pixel 211 corresponding to one of the imaging pixels 211. The image pick-up section 201 and the storage section 202 are connected together via a signal line p2str for transferring signal charges from the image pick-up section 201 to the storage section 202.

Around the image pick-up section 201, the image pick-up device includes a read-out shift register 203 for successively shifting the read-out pulse line by line, and a reset shift register 204 for successively shifting the reset pulse line by line. The read-out pulse and the reset pulse are sent to each imaging pixel 211 of the image pick-up section 201 via a read-out pulse supply line rd-p and a reset pulse supply line rst-p, respectively. The imaging pixel 211 receiving the read-out pulse outputs the signal charge, and the imaging pixel 211 receiving the reset pulse resets the signal charge.

Around the storage section 202, the image pick-up device includes a skip scanning shift register 205 for outputting a read-out pulse used in the "skip read-out operation", a progressive scanning shift register 206 for outputting a read-out pulse used in the "progressive read-out operation", a selector 207 for selectively supplying the output from the skip scanning shift register 205 or the output from the progressive scanning shift register 206 to the storage section 202, and a read shift register 208 used when transferring the signal charge from the image pick-up section 201 to the storage section 202. The read-out pulse output from the selector 207 is supplied to each image-storing pixel 221 of the storage section 202 via a read-out pulse supply line rd-s. The transfer pulse output from the read shift register 208 is supplied to each image-storing pixel 221 of the storage section 202 via a transfer pulse supply line trn.

The progressive scanning shift register 206 generates a pulse for partially reading out the high-resolution image (obtained by reading out all lines) in each frame (e.g., outputting a ¼ screen in each frame to form one full screen over four frames). The skip scanning shift register 205 generates a pulse for obtaining in each frame one screen of the low-resolution image obtained by the skip read-out operation. The skip scanning shift register 205 will later be described in detail with reference to FIG. 15.

The image pick-up device also includes a group of select transistors 209, a horizontal shift register 210 and an output amplifier 211. The signal charges stored in the image-storing pixels 221 of the storage section 202 are output to the outside via signal output lines sig-out and through the group of select transistors 209 and the output amplifier 211 based on the order in which they are selected by the horizontal shift register 210.

A timing generation circuit 212 supplies pulses to the read-out shift register 203, the reset shift register 204, the skip scanning shift register 205, the progressive scanning shift register 206, the selector 207, the read shift register 208, the horizontal shift register 210 and a reset pulse supply line rst-s. Note however that the timing generation circuit 212 may be separately provided on a different chip from the image pick-up device.

The signal line p2str, the read-out shift register 203, the read-out pulse supply line rd-p, the read shift register 208 and the transfer pulse supply line trn together form a transfer section. The signal output line sig-out, the skip scanning shift register 205, the progressive scanning shift register 206, the selector 207 and the read-out pulse supply line rd-s together form an output section.

Figure 13:
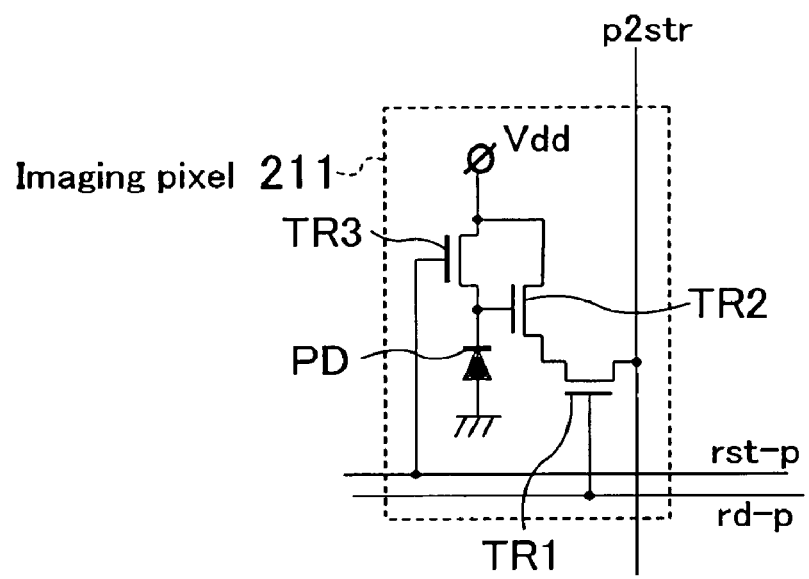
FIG. 13 shows an exemplary circuit configuration of an imaging pixel in the multi-pixel-resolution image pick-up device of FIG. 12.

FIG. 13 shows an exemplary configuration of the imaging pixel 211. The configuration of FIG. 13 is an orthodox 3-transistor configuration. Specifically, the imaging pixel 211 includes a photodiode PD for generating a signal charge in response to light, a read-out transistor TR1 whose gate is connected to the read-out pulse supply line rd-p for outputting the signal charge to the signal line p2str, a source follower transistor TR2, and a reset transistor TR3 whose gate is connected to the reset pulse supply line rst-p for resetting the stored signal charge.

Figure 14:
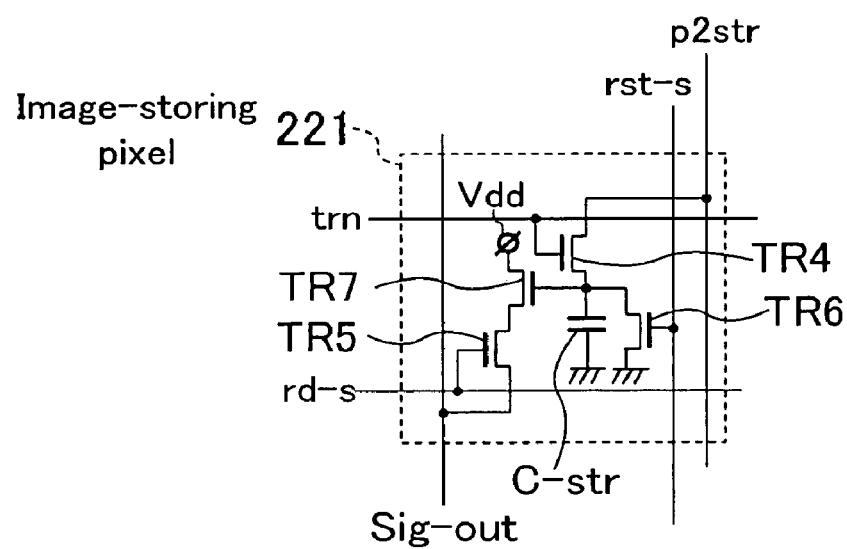
FIG. 14 shows an exemplary circuit configuration of a image-storing pixel in the multi-pixel-resolution image pick-up device of FIG. 12.

FIG. 14 shows an exemplary configuration of the image-storing pixel 221. The configuration of FIG. 14 includes four transistors and one capacitor. Specifically, the image-storing pixel 221 includes a transistor TR4 whose gate is connected to the transfer pulse supply line trn, a storage capacitor C-str for storing a signal charge transferred from the imaging pixel 211 through the signal line p2str and the transistor TR4, a transistor TR5 whose gate is connected to the read-out pulse supply line rd-s for reading out the signal charge stored in the storage capacitor C-str to the signal output line sig-out, a transistor TR6 whose gate is connected to the reset pulse supply line rst-s for resetting the storage capacitor C-str to the GND level, and a source follower transistor TR7.

Figure 15:
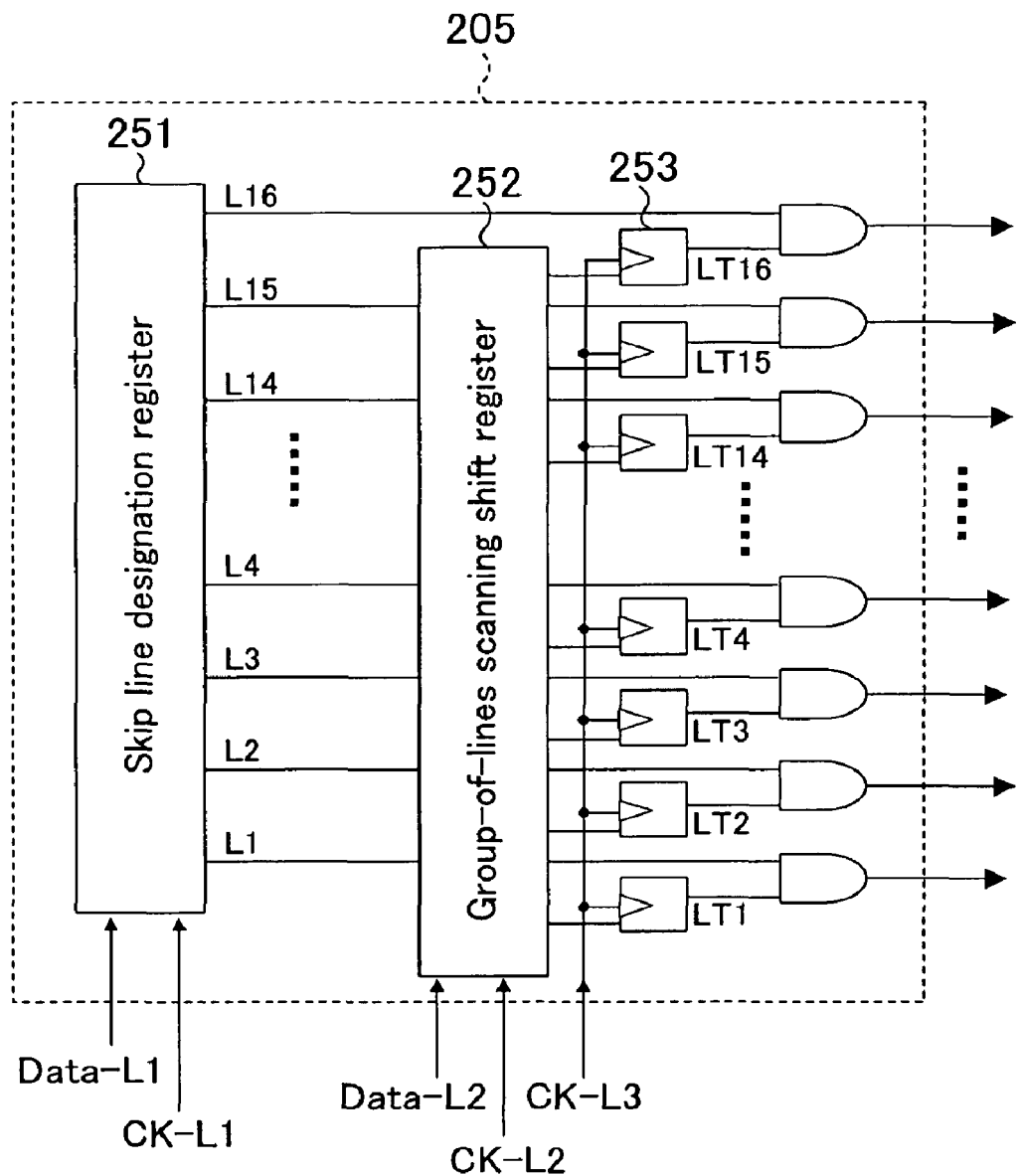
FIG. 15 shows an exemplary circuit configuration of a skip scanning shift register in the multi-pixel-resolution image pick-up device of FIG. 12.

FIG. 15 shows an exemplary configuration of the skip scanning shift register 205. In FIG. 15, the skip scanning shift register 205 includes a skip line designation register 251, a group-of-lines scanning shift register 252, a D latch 253, etc. The details of the operation thereof will be described later.

Figure 16:
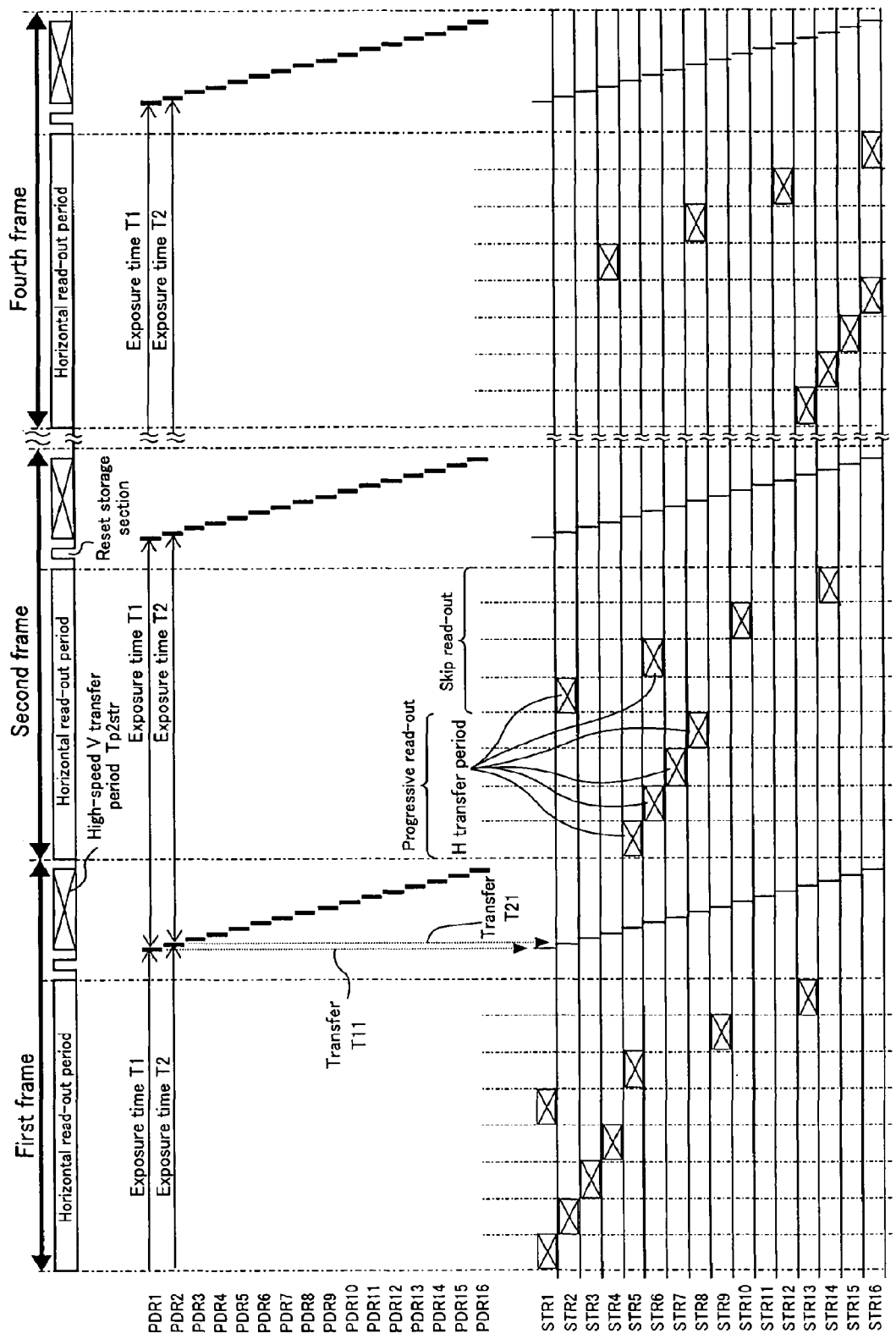
FIG. 16 is an operation sequence diagram illustrating the outline of a series of operations, i.e., the image-recording operation, the transfer operation and the read-out operation, by the multi-pixel-resolution image pick-up device shown in FIGS. 12 to 15.

FIG. 16 is an operation sequence diagram illustrating the outline of a series of operations, i.e., the image-recording operation, the transfer operation and the read-out operation, by the multi-pixel-resolution image pick-up device shown in FIGS. 12 to 15. FIG. 16 shows the general operation over a series of four frames (note however that the third frame is omitted due to limitations of space).

In the first frame, after the exposure time T1 for a line PDR1 in the image pick-up section 201 is completed, the signal charges on the line PDR1 are transferred at once to pixels along the corresponding line STR1 in the storage section 202 during the following transfer period T11. The transferred signal charges are stored in the storage capacitors C-str in the image-storing pixel 221 of corresponding horizontal positions. Then, after the exposure time T2 for a line PDR2 is completed, the signal charges on the line PDR2 are transferred at once to pixels along the corresponding line STR2 in the storage section 202 during the following transfer period T21. The transferred signal charges are stored in the storage capacitors C-str in the image-storing pixel 221 of corresponding horizontal positions.

The read-out/transfer operation is performed successively for 16 lines PDR1 to PDR16 during the high-speed V transfer period Tp2str. Specifically, the signal charges obtained by photoelectric conversion by the photodiodes PD in the imaging pixels 211 during an exposure time are transferred in the high-speed V transfer period Tp2str from the image pick-up section 201 to the storage section 202, and are stored in the storage section 202.

The signal charges stored in the storage section 202 in the first frame are read out to the outside during the horizontal read-out period in the next, second frame. In the second frame, the progressive read-out operation is performed for the four lines STR5 to STR8, and the skip read-out operation is performed for the four lines STR2, STR6, STR10 and STR14. The other lines are not read out. As the reset pulse is applied to the reset pulse supply line rst-s in the storage section resetting period, the storage capacitors C-str in all the image-storing pixels 221 of the storage section 202 are all reset to the GND level.

A similar scanning operation is performed in the subsequent frames. In the fourth frame, the progressive read-out operation is performed for the four lines STR13 to STR16, and the skip read-out operation is performed for the four lines STR4, STR8, STR12 and STR16. The other lines are not read out. As the reset pulse is applied to the reset pulse supply line rst-s in the storage section resetting period, the storage capacitors C-str in all the image-storing pixels 221 of the storage section 202 are all reset to the GND level.

FIG. 16 shows an example where in each frame, a series of four lines are read out in a progressive read-out operation and four non-contiguous lines selected every four lines are read out in a skip read-out operation. However, the number of lines to be read out is not limited to this, and the number of lines to be read out in the progressive read-out operation does not need to be the same as the number of lines to be read out in the skip read-out operation. For example, the progressive read-out operation may be performed for a series of n lines, and the skip read-out operation may be performed every m lines. Moreover, while the line STR6 is read out more than once in the second frame for example for the sake of simplicity, a line does not need to be read out more than once.

Figure 17:
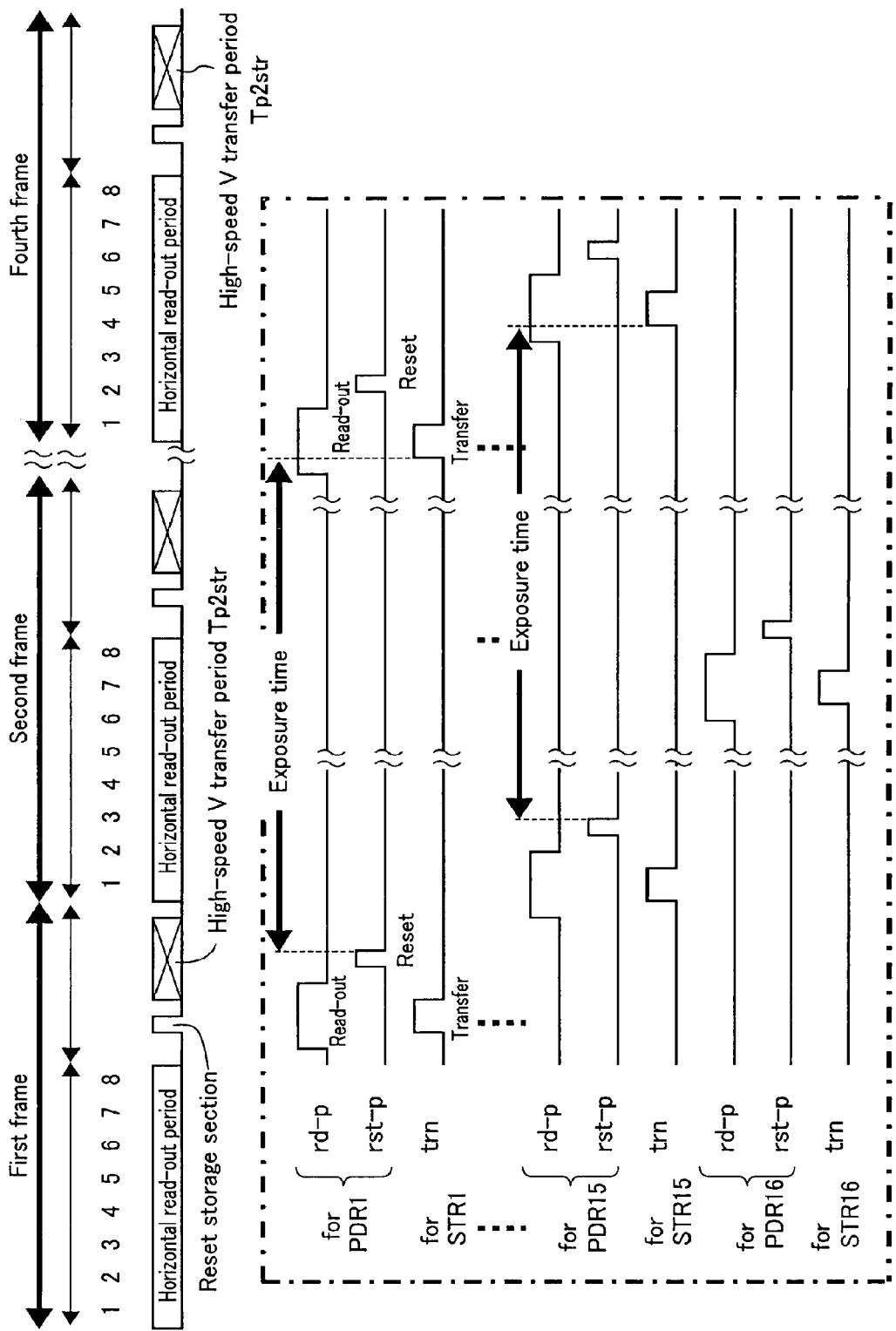
FIG. 17 is a timing diagram showing the operation during the high-speed V transfer period of FIG. 16.

FIG. 17 is a timing diagram showing an operation in the high-speed V transfer period Tp2str. Referring to FIG. 17, after the exposure time T1 is completed for the line PDR1 in the first frame, a read-out pulse is supplied to the read-out pulse supply line rd-p. The read-out pulse is applied to the gate of the transistor TR1 in the imaging pixel 211 of FIG. 13, and a signal potential corresponding to the signal charge of the photodiode PD is output to the signal line p2str via the source follower transistor TR2. In the line STR1, when a transfer pulse is supplied to the transfer pulse supply line trn, the transfer pulse is applied to the gate of the transistor TR4 in the image-storing pixel 221 of FIG. 14, and a signal charge is transferred from the signal line p2str to the storage capacitor C-str via the transistor TR4.

After the read-out pulse is supplied, a reset pulse is supplied to the reset pulse supply line rst-p. The reset pulse is applied to the gate of the transistor TR3 in the imaging pixel 211 of FIG. 13, thereby resetting the photodiode PD.

With such an operation, the signal charges of the imaging pixels 211 in each of the lines PDR1 to PDR16 in the image pick-up section 201 are all transferred to the image-storing pixels 221 of the corresponding one of the lines STR1 to STR16 in the storage section 202.

Figure 18:
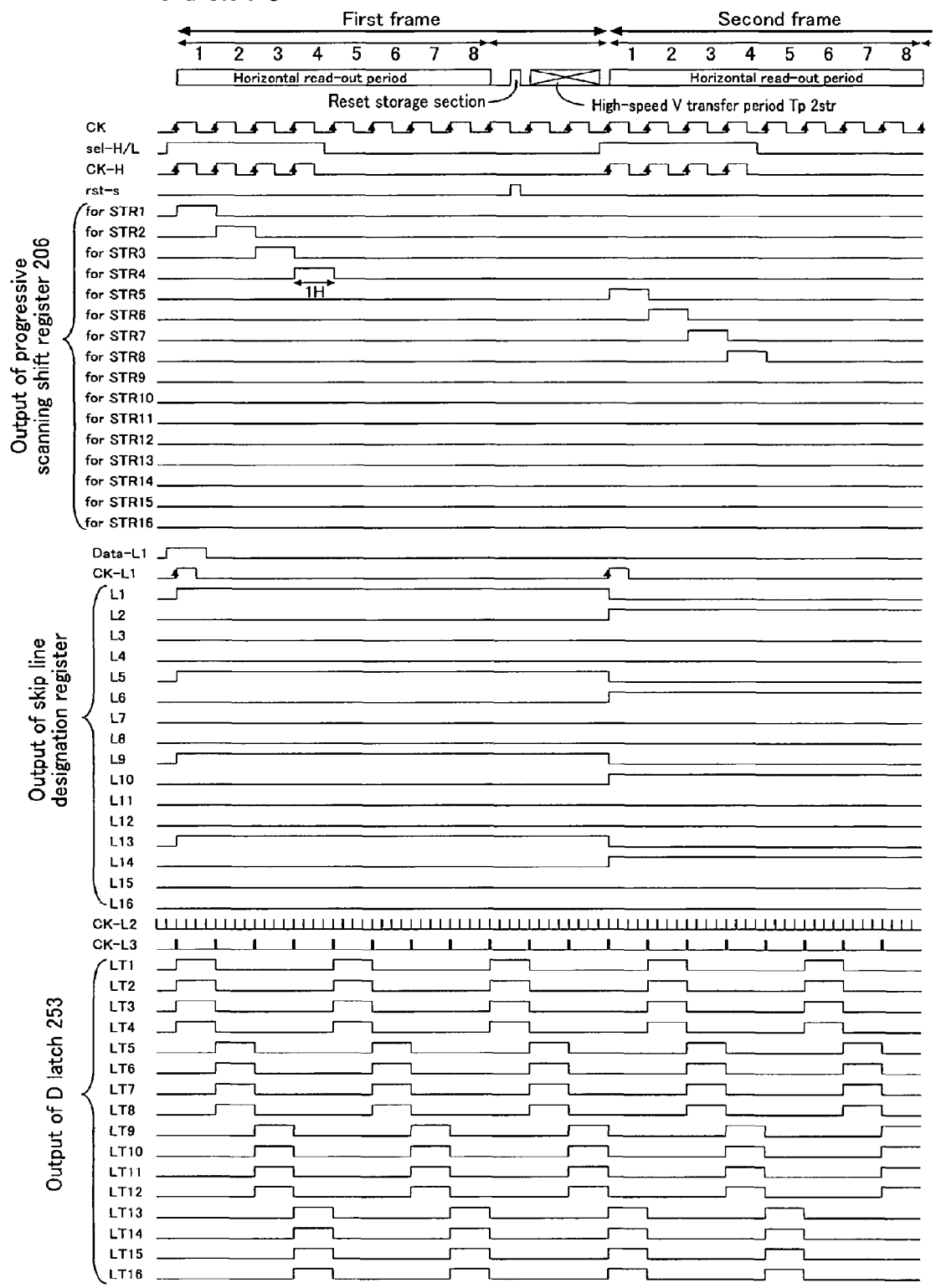
FIG. 18 is a timing diagram showing the operation during the horizontal read-out period of FIG. 16.

FIG. 18 is a timing diagram showing the operation in the horizontal read-out period and the storage section resetting period. In FIG. 18, the clock CK is supplied from the timing generation circuit 212. In the horizontal read-out period of the first frame, the shift clock CK-H, which is cut out from the clock CK by the selection signal sel-H/L, is given to the progressive scanning shift register 206. Receiving the shift clock CK-H and the shift data Data-H (not shown) supplied from the timing generation circuit 212, the progressive scanning shift register 206 outputs the read-out pulse toward the lines STR1 to STR4. In the horizontal read-out period of the second frame, the progressive scanning shift register 206 outputs the read-out pulse toward the lines STR5 to STR8.

As shown in FIG. 15, the skip scanning shift register 205 includes the skip line designation register 251 for determining the lines to be skipped in the frame, and the group-of-lines scanning shift register 252 for scanning a plurality of lines with the same phase. First, the skip line designation register 251 receives the clock CK-L1 from the timing generation circuit 212 and skip line selection data Data-L1, and brings those of the outputs L1 to L16 corresponding to lines to be skipped in the frame to "H". In the first frame, the outputs L1, L5, L9 and L13 are turned "H".

Next, the group-of-lines scanning shift register 252 receives the data shift clock CK-L2 from the timing generation circuit 212 and the data Data-L2. It is assumed herein that the data Data-L2 is data whose period is equal to four cycles of the data shift clock CK-L3 and whose level is "H" during one cycle (corresponding to four pulses of the data shift clock CK-L2) and "L" during the following three cycles. Thus, the outputs LT1 to LT16 of the D latch 253 are as shown in FIG. 18.

Figure 19:
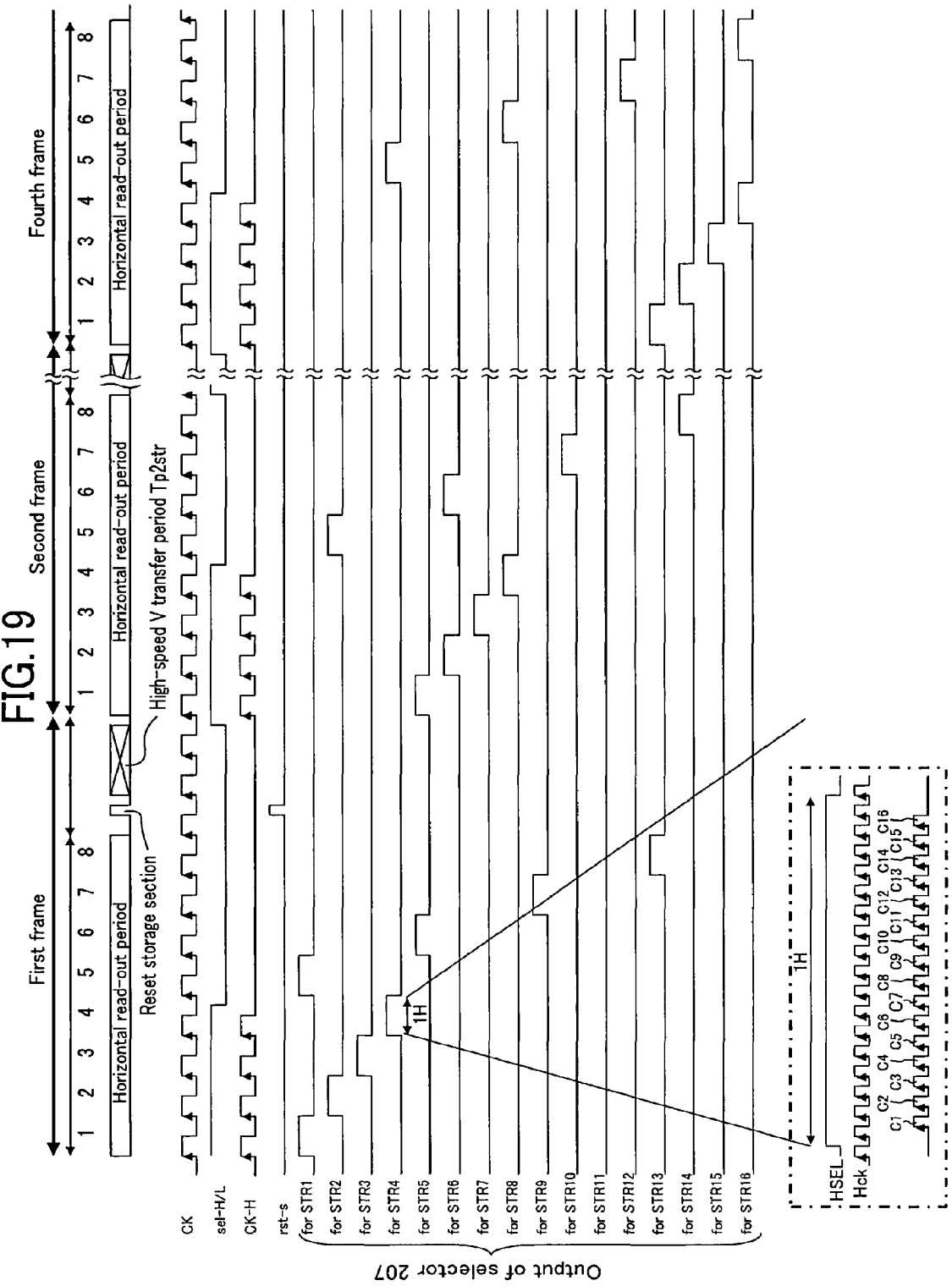
FIG. 19 is a timing diagram showing the output of a selector of FIG. 12.

FIG. 19 is a timing diagram showing the output of the selector 207. The selector 207 selects the output of the progressive scanning shift register 206 when the selection signal sel-H/L is at "H", and selects the output of the skip scanning shift register 205 when the selection signal sel-H/L is at "L". Thus, as a result of the series of operations shown in FIG. 18, outputs as shown in FIG. 19 are obtained for the lines STR1 to STR16.

The number of lines to be skipped can be changed by changing the data Data-L2, the data shift clock CK-L2 and the data shift clock CK-L3, which are output from the timing generation circuit 212. The number of consecutive lines to be scanned in the progressive scanning operation can be changed by changing the "H" period of the selection signal sel-H/L, which is also output from the timing generation circuit 212. Thus, the number of lines to be skipped and the number of consecutive lines to be scanned in the progressive scanning operation are not dictated by the circuit configuration, but the mode of operation can freely be set, allowing for the operation with a high degree of freedom, in the present embodiment.

The operation of reading out one line in the horizontal read-out period is performed as follows. The horizontal shift register 210 receives a one-horizontal-period selection signal HSEL and the horizontal transfer clock Hck supplied from the timing generation circuit 212, and in response supplies pulses to the transistors C1 to C16 of the group of select transistors 209 one after another. As a result, the signal charges stored in the storage capacitors C-str of the image-storing pixels 221 are successively transferred from the lines STR1 to STR16 as they are selected by the output of the selector 207 to an external signal processing circuit (not shown) via the output amplifier 211, thus completing the read-out operation.

Referring back to the configuration of FIG. 8, the pixel values progressively read out from the multi-pixel-resolution image pick-up section 102 are temporarily stored in the high-resolution window memory 105 as the high-resolution image HWF(t). The pixel values read out in a skip read-out operation from the multi-pixel-resolution image pick-up section 102 are sub sampled to ¼ in the H direction by the sub sampling circuit 115 and then temporarily stored in the low-resolution frame memory 103 as one frame screen. The sub sampling process is realized by allowing only pixel values of the pixel numbers (2,6,10,14) in the H direction to pass while discarding the other pixel values in the example of FIGS. 10 and 11.

With the read-out operation of FIGS. 10A to 10D as it is, the low-resolution image in the window region of the frame will be dropped. In view of this, the downward resolution conversion section 106 performs an image process such as a sampling process for the high-resolution image HWF(t), and stores the resulting image at the corresponding position in the low-resolution frame memory 103. With the example of FIGS. 10A to 10D, for example, particular pixels at the positions of coordinates (V,H)=(2,3), (6,3), (10,3) and (14,3) can be sampled with the bottom side of the window region being the reference point (origin) in the V direction.

The low-resolution image LF(t), which has been sub sampled to ¼×¼ and stored in the low-resolution frame memory 103, is successively recorded by a low-resolution video data recording section 104 frame by frame. The process may or may not employ a video data compression scheme known in the art.

The luminance component of the high-resolution image HWF(t) stored in the high-resolution window memory 105 is input to the texture conversion section 107, and is converted to a luminance image texture feature by a multi-resolution conversion such as wavelet transform. The luminance component of the low-resolution image output from the downward resolution conversion section 106 is input to the image size correction/texture conversion section 112. In the image size correction/texture conversion section 112, the low-resolution image is once converted back to the same number of pixels as the high-resolution image and then subjected to a multi-resolution conversion such as a wavelet transform, thereby obtaining a luminance image texture feature. The method for correcting the image size may be of any type, including bilinear interpolation, bicubic interpolation, and the like. The image size correction method used in this process is used as a pre-process when performing the resolution increasing process on the low-resolution image for displaying the video data with a high resolution.

Figure 20:
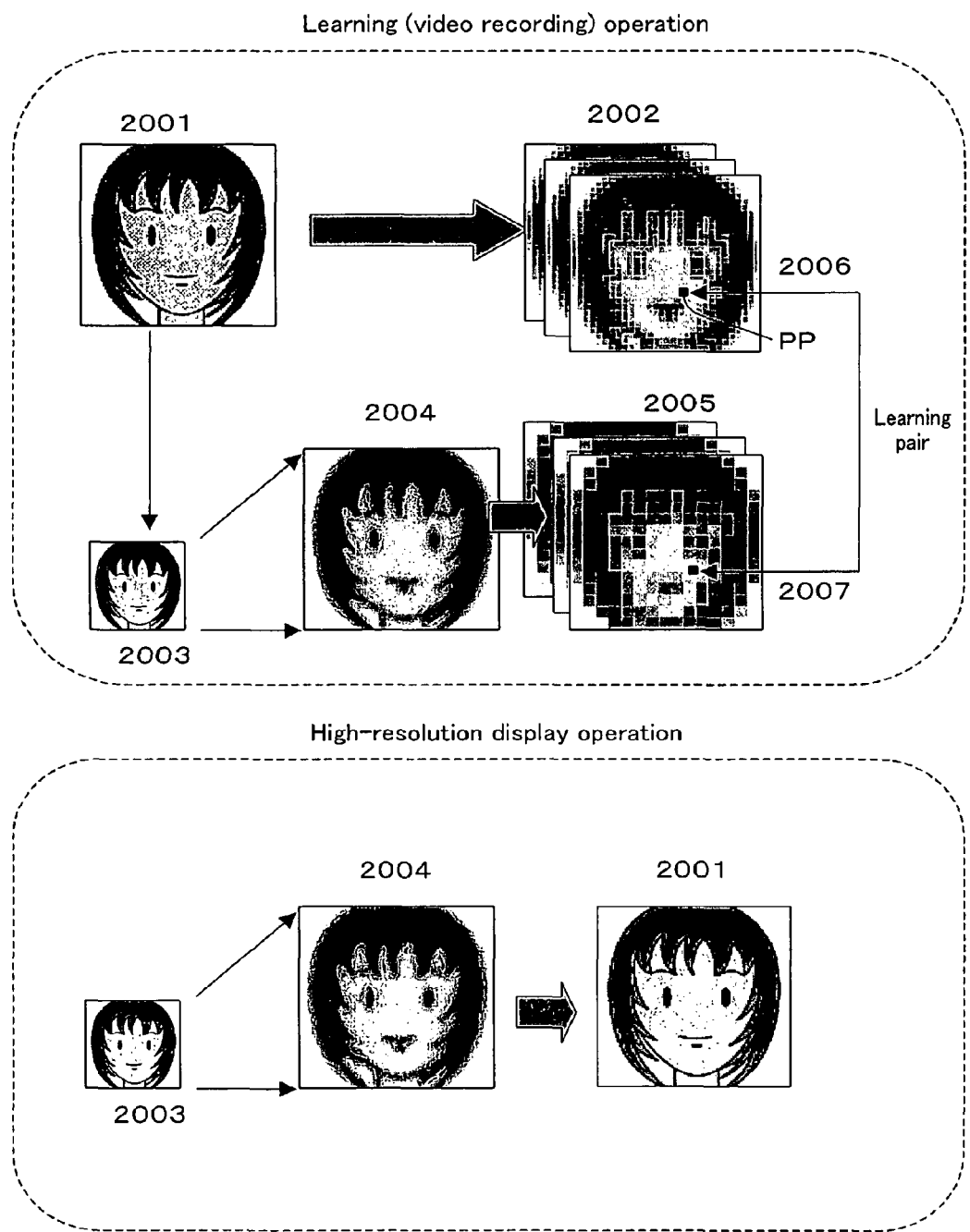
FIG. 20 conceptually shows a texture conversion process according to the second embodiment of the present invention.

FIG. 20 conceptually shows the texture conversion process. Referring to FIG. 20, an image 2001 is a high-resolution image in the window region, which is in a square shape in the illustrated example. An image 2002 is a wavelet coefficient image made up of a plurality of levels obtained by performing the wavelet transform operation on the high-resolution image 2001. An image 2003 is a low-resolution image, an image 2004 is an image obtained by performing a pixel size correction process on the image 2003 to match the number of pixels with that of the high-resolution image 2001, and an image 2005 is a wavelet coefficient image obtained from the image 2004. Where the image 2001 and the image 2004 are referred to as a sharpened image and a blurred image, respectively, reference numerals 2006 and 2007 are texture feature quantities having a $16^{th}$-order component at the pixel position PP in the sharpened image 2001 and in the blurred image 2004, respectively.

During the learning (video recording) process, the process learns the correlation between the texture feature quantities 2006 and 2007 to thereby obtain, as the resolution increasing parameter, a conversion rule for converting the texture feature 2007 of a lower resolution to the texture feature 2006 of a higher resolution. Then, in the resolution increasing process, the received low-resolution image 2003 is subjected to a pixel size correction process to obtain the blurred image 2004, to which the learned resolution increasing parameter is applied to thereby obtain the high-resolution image 2001. In the illustrated example, the resolution increasing process is performed by using the image, which is the source of the learning process, and therefore an ideal resolution increasing process is realized. In practice, the process deals with unlearned images, and it is not always possible to restore an ideal high-resolution image. Nevertheless, in the present invention, the resolution increasing parameter is learned in the window region, accounting for a portion of the object, during the video recording process, whereby it is possible to realize a resolution increasing process of a much higher precision than a method in which the resolution increasing parameter is obtained by leaning a similar object in advance.

The texture learning section 108 learns the correlation between the texture conversion section 107 and the texture feature output from the image size correction/texture conversion section 112 to create an analysis code book and a reproduction code book and produce the resolution increasing parameter. The method will now be described with reference to FIG. 21.

It is assumed herein that the blurred image and the sharpened image are each made up of 100 pixels. Each pixel of the blurred image and the sharpened image is converted to a multi-resolution vector, to thereby obtain multi-resolution vectors U1 to U100 and V1 to V100. The vectors U1 to U100 and the vectors V1 to V100 are in such a relationship that each of them is of the same pixel position as its counterpart. Therefore, the code book can be produced so that when a vector U is input, a corresponding vector V is output. In practice, however, the multi-resolution vectors are classified into representative vectors by a vector quantization process.

Figure 21:
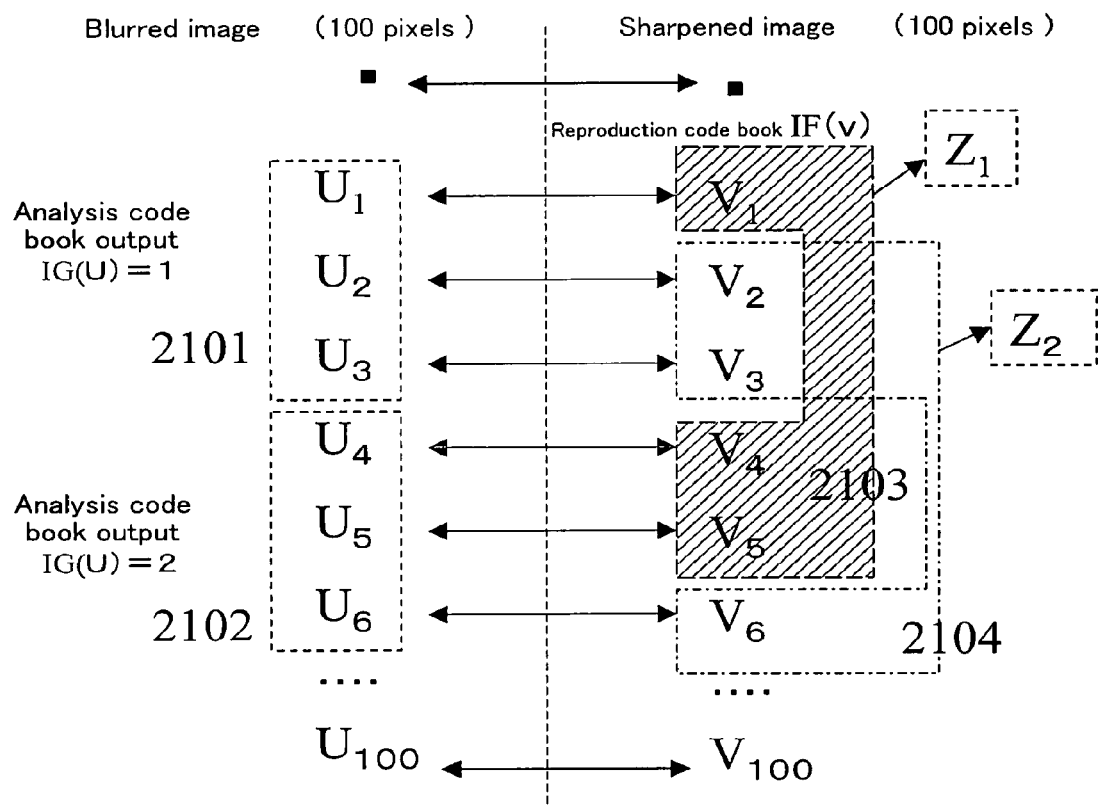
FIG. 21 shows a method for producing an analysis code book and a reproduction code book.

In the example of FIG. 21, the vectors U are quantized into two types 2101 and 2102, and the vectors V into two types 2103 and 2104. A quantization index of the analysis code book or the reproduction code book is the number assigned to a set of vectors obtained by the quantization process. Looking up in the code book means to input a vector number V to obtain a number 1 or 2, which designates a set of vectors obtained by the quantization process. A quantized set 2103 is assigned a representative vector Z1, and the quantized set 2104 a representative vector Z2. A representative vector for a quantized set is calculated by, for example, taking an average value or a representative value of the vectors belonging to that quantized set. In the present invention, the code book as described above is calculated for each frame as a function of time t, thus obtaining the resolution increasing parameter P(t).

Next, the process produces an analysis code book IG for outputting a quantization index (1 or 2) in response to a vector number, and a reproduction code book IF for outputting a reproduction vector for an input quantization index (1 or 2). By using the produced analysis code book and reproduction code book in combination with each other, it is possible to convert a multi-resolution vector of a blurred image to that of a sharp image.

The obtained analysis code book and reproduction code book are stored as the resolution increasing parameter DP by the resolution increasing parameter recording section 109.

Figure 22:
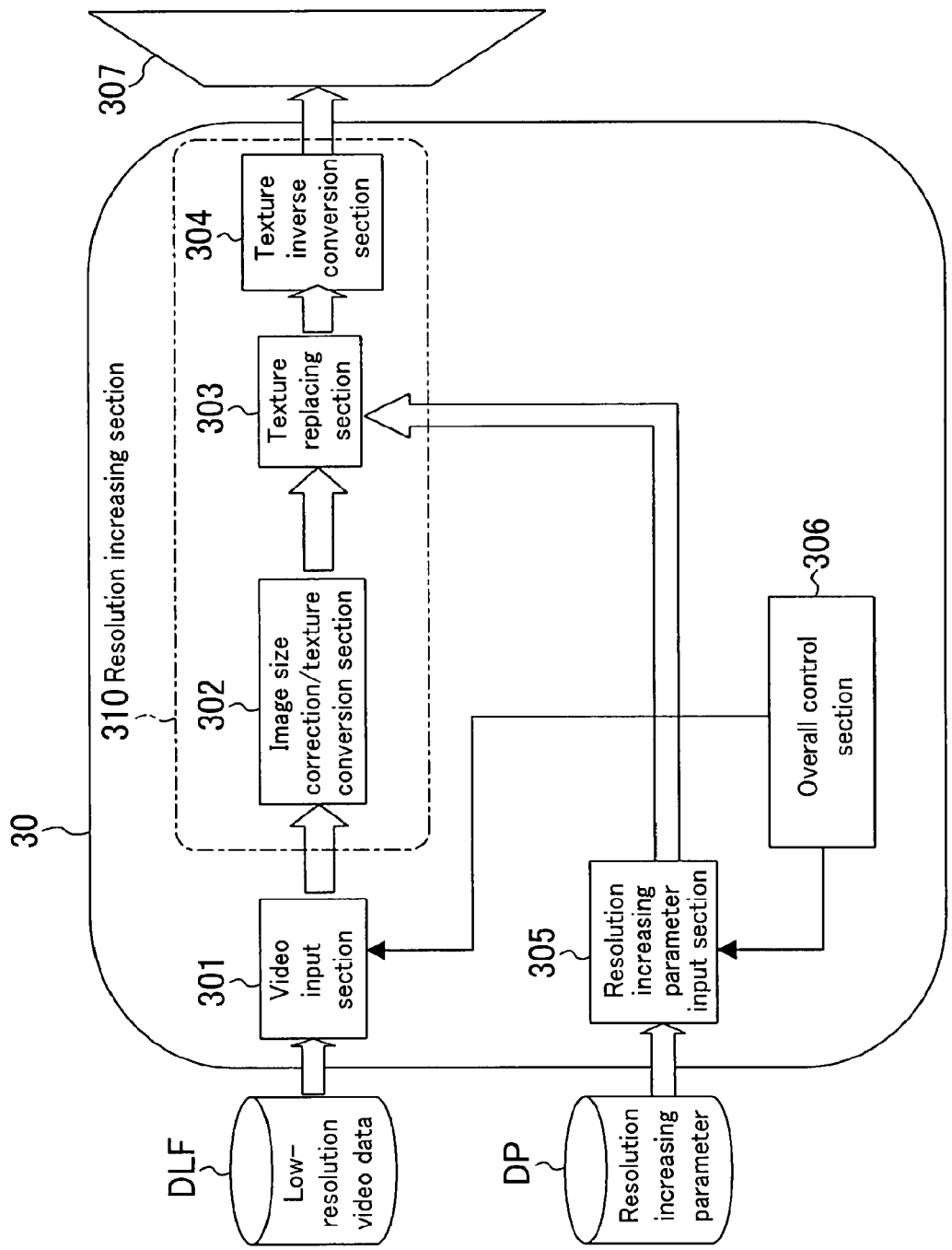
FIG. 22 shows a configuration of an image display section according to the second embodiment of the present invention.

FIG. 22 shows a configuration of an image display section of the present embodiment. The configuration of FIG. 22 has a function of displaying, with a high resolution, video data recorded by an image processing device such as a camcorder of FIG. 8. For example, the image display section is implemented as a display section of the camcorder or provided in a portable display device or a household large-screen TV set. An image display section 30 of FIG. 22 includes a video input section 301, an image size correction/texture conversion section 302, a texture replacing section 303, a texture inverse conversion section 304, a resolution increasing parameter input section 305, an overall control section 306 and a display 307. The image size correction/texture conversion section 302, the texture replacing section 303 and the texture inverse conversion section 304 together form a resolution increasing section 310.

First, the low-resolution video data DLF and the resolution increasing parameter DP recorded by the image processing device 10 of FIG. 8 are input to the image display section 30 via a network or via various other media. The overall control section 306 sends a command to a video data input section 301, and the video data input section 301 receiving the command expands and reads out the compressed low-resolution video data DLF, for example. It is assumed herein that the video data is ordinary color video data, and therefore a YCrCb luminance-color difference signal is produced. The read-out image is of a low resolution whose pixel size is ¼×¼ of the original high-resolution image. Therefore, the image size correction/texture conversion section 303 then enlarges the image size to 4×4 to obtain a blurred image, and performs a texture conversion process independently on the luminance component Y and the color difference component CrCb. This operation is similar to the image size correction/texture conversion section 112 of FIG. 8, and will not be further described below.

Next, the overall control section 306 sends a command to the resolution increasing parameter input section 305, and the resolution increasing parameter input section 305 receiving the command reads out the resolution increasing parameter DP and inputs the parameter to the texture replacing section 303. By using the analysis code book and the reproduction code book described in the resolution increasing parameter in combination with each other, the texture replacing section 303 converts a multi-resolution vector (texture feature) representing the texture of a blurred image to a multi-resolution vector representing the texture of a sharp image. Then, the texture inverse conversion section 304 converts the sharp image texture feature to a resolution-increased luminance image. Then, the resolution-increased luminance Y image and the original color difference CrCb image are input to the display 307, and the high-resolution image is displayed as video data.

The above description is based on the principle that color video data is separated into luminance/color difference components YCrCb, and the resolution of each component is increased independently. Note however that the present invention is not limited to this, but may employ a method in which color video data is separated into RGB components, which are subjected to the resolution increasing process independently, or a method in which a black-and-white image having only the luminance component is subjected to the resolution increasing process.

In the present embodiment, it is possible to produce and display a high-resolution video data from a recorded low-resolution video data, as described above, whereby the amount of information needed to be stored when the camera records the video is small, and there is no need to use a power-consuming super speed imaging device for recording high-resolution video data. Thus, the present invention is applicable to a super-small video camera having limitations on the amount of power that can be consumed. As a result, the present invention provides significant advantages that video data recorded by a super-small video camera can be displayed on an enlarged scale with a high image quality on a large-screen display, and that a portion of the image of interest can be further enlarged.

Third Embodiment

Figure 23:
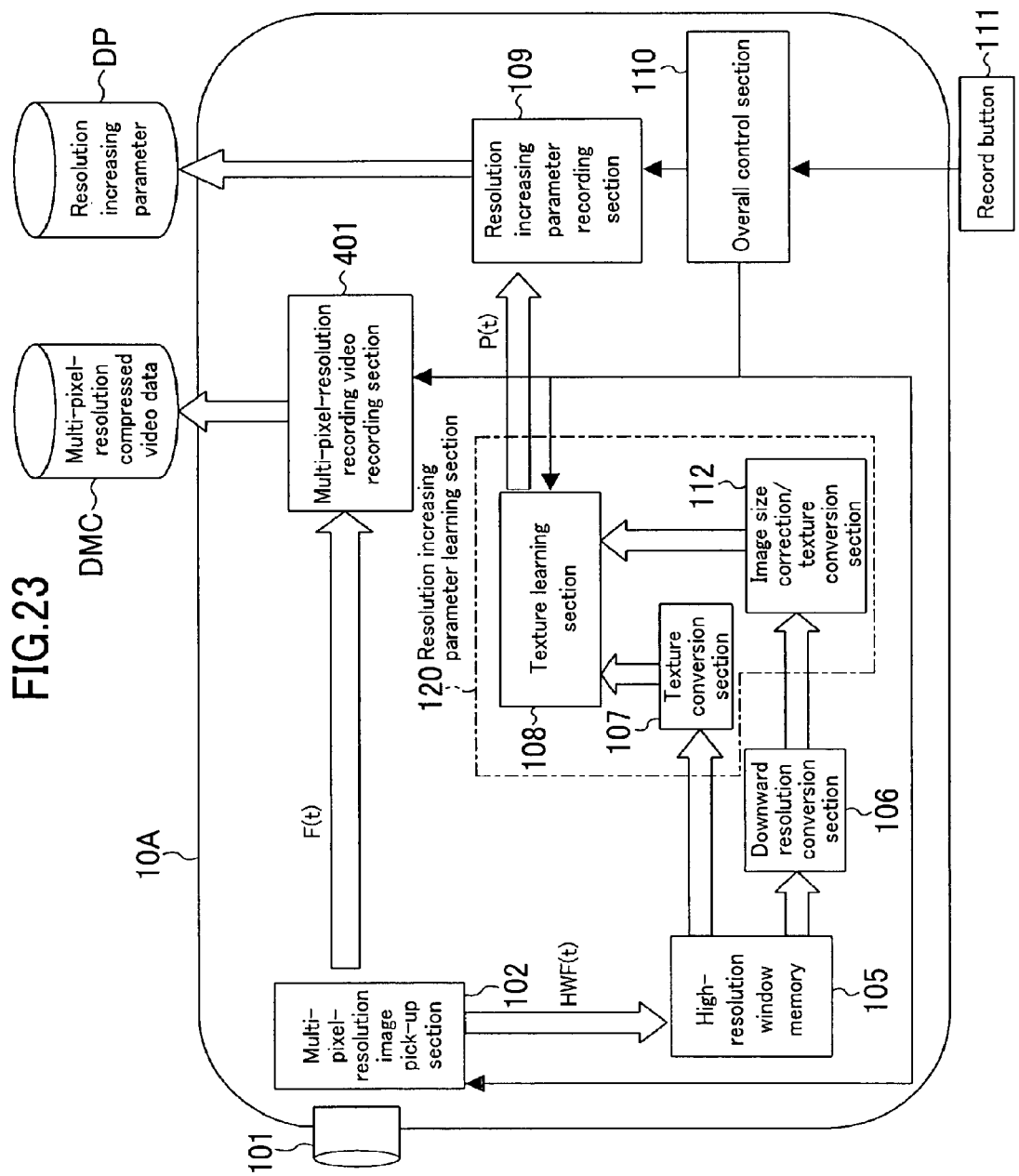
FIG. 23 shows a configuration of an image processing device according to a third embodiment of the present invention.

FIG. 23 is a block diagram showing an exemplary configuration of an image processing device according to a third embodiment of the present invention, wherein the present invention is applied to a camcorder as in FIG. 8. The configuration differs from that of FIG. 8 in that the low-resolution frame memory 103 is omitted, and a multi-pixel-resolution video recording section 401 for recording multi-pixel-resolution compressed video data DMC is provided instead of the low-resolution video recording section 104 for recording the low-resolution video data DLF. Thus, while video data with a lowered resolution is recorded in the second embodiment, image data obtained by the multi-pixel-resolution image pick-up section 102 is stored as it is in the present embodiment. By effectively using the obtained multi-pixel-resolution video data without lowering its resolution, the present embodiment aims to improve the performance of the resolution increasing process.

When the record button 111 is pressed, the overall control section 110 sends out a record command to the multi-pixel-resolution image pick-up section 102 and the multi-pixel-resolution video recording section 401. When the record command is received, the multi-pixel-resolution image pick-up section 102 performs the recording process, wherein the multi-pixel-resolution video data F(t) is sent to the multi-pixel-resolution video recording section 401. Receiving the multi-pixel-resolution video data F(t), the multi-pixel-resolution video recording section 401 performs a process such as a compression process to be described later, and records the resulting data as the multi-pixel-resolution compressed video data DMC on a storage medium or a network.

Simultaneously with the record command, the overall control section 110 sends out a learning signal to the texture learning section 108 and the resolution increasing parameter recording section 109. The high-resolution image HWF(t) in the window region obtained by the multi-pixel-resolution image pick-up section 102 is stored in the high-resolution window memory 105, and is input to the texture learning section 108 via the texture conversion section 107. The high-resolution image HWF(t) is input to the texture learning section 108 also via the image size correction/texture conversion section 112 after being subjected to the downward resolution conversion by the downward resolution conversion section 106. The texture learning section 108 learns the resolution increasing parameter P(t), being a resolution conversion rule, by associating together textures from images of the same point in time but of different resolutions. The resolution increasing parameter recording section 109 stores the parameter as the resolution increasing parameter DP, or sends out the parameter to a network.

Figure 24:
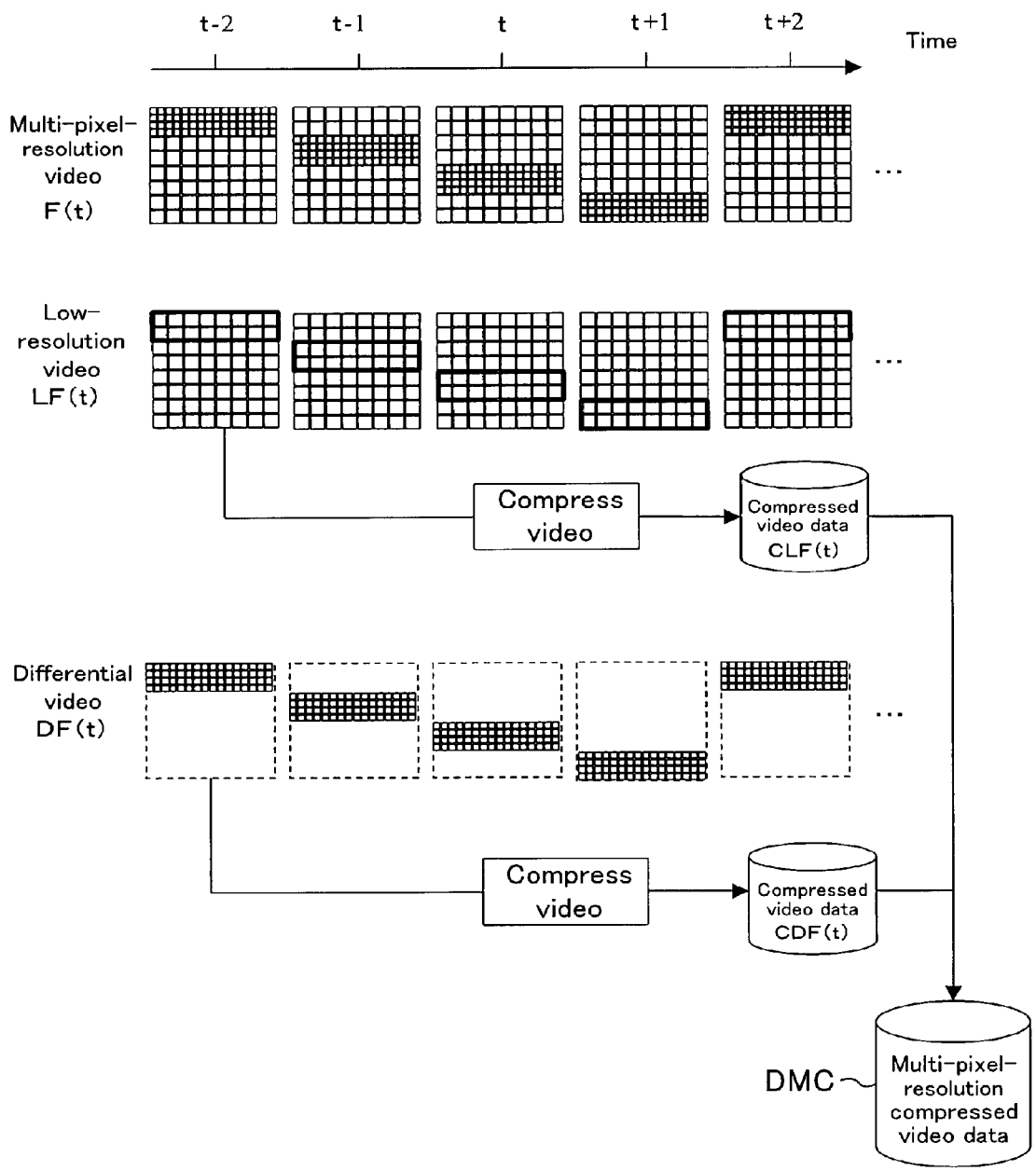
FIG. 24 shows an image format of multi-pixel-resolution compressed video data according to the third embodiment of the present invention.

FIG. 24 shows an image format of the multi-pixel-resolution compressed video data DMC. The process illustrated herein is performed by the multi-pixel-resolution video recording section 401. The multi-pixel-resolution recorded video data F(t) recorded by the multi-pixel-resolution image pick-up section 102 includes portions of different pixel resolutions within one frame, and therefore cannot efficiently be compressed as video data. Therefore, there is first produced video data LF(t) whose resolution has been lowered entirely. This can be performed by an image filtering process as described above in the second embodiment, for example. Next, the low-resolution video data LF(t) is compressed to produce low-resolution compressed video data CLF(t) as first compressed data. This can be done by using a video compression method known in the art.

Then, differential video data DF(t) is produced.

$$DF(t)=F(t)-LF(t) \qquad \text{Exp. 3}$$

The differential video data DF(t) has a differential value only in the window region where the high-resolution image has been obtained, with the differential value being zero in other regions. Thus, the differential video data DF(t) has data over a small area. In addition, the data contains a lot of high-frequency components, thus resulting in a high compression efficiency in the quantization process. In view of this, the differential video data DF(t) is compressed separately to obtain the differential compressed video data CDF(t) as second compressed data. The two compressed video data CLF(t) and CDF(t) are combined together in a single image format, which is recorded as the multi-pixel-resolution compressed data DMC.

Figure 25:
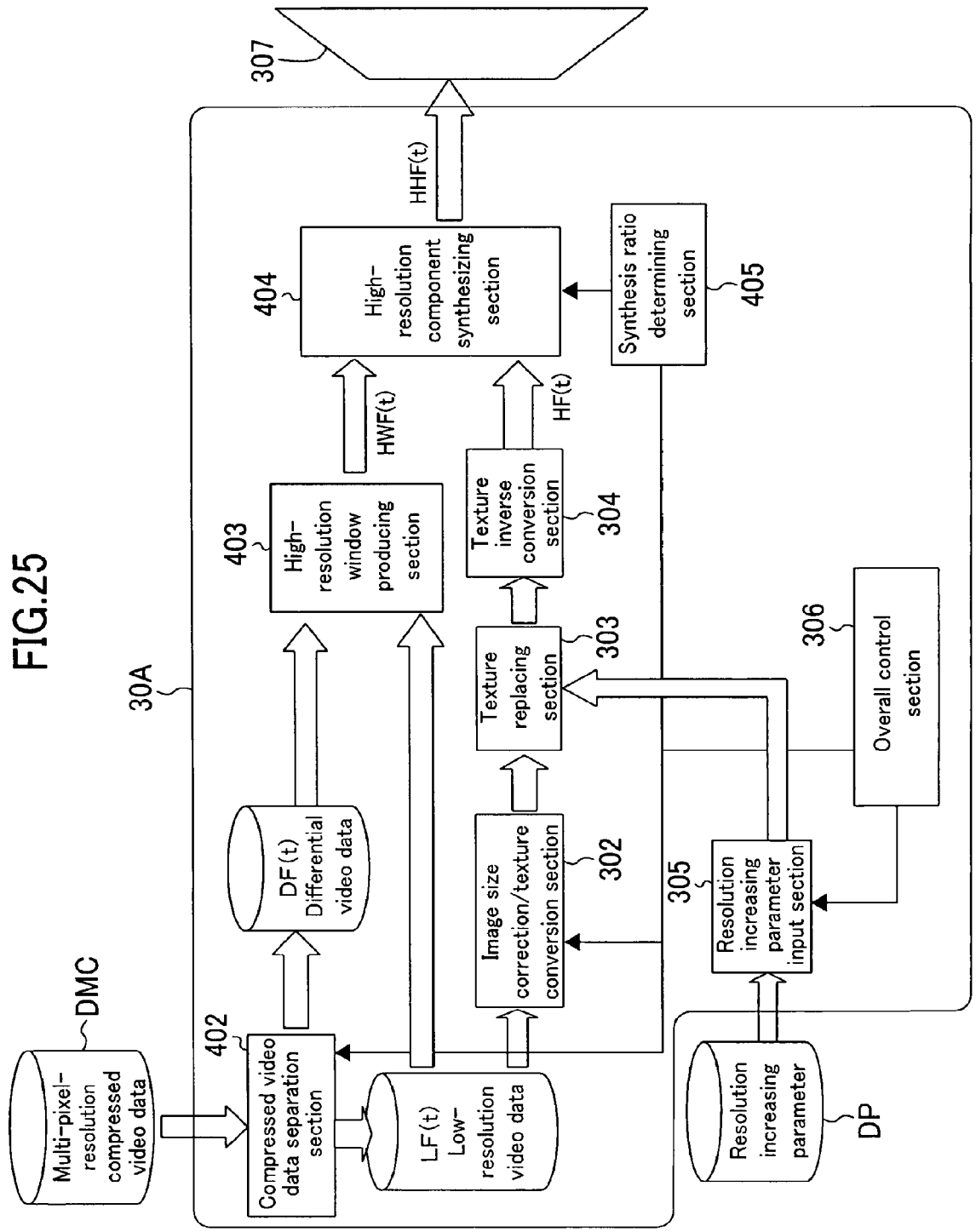
FIG. 25 shows a configuration of an image display section according to the third embodiment of the present invention.

FIG. 25 shows a configuration of an image display section of the present embodiment. The configuration of FIG. 25 has a function of displaying, with a high resolution, video data recorded by an image processing device such as a camcorder of FIG. 23. For example, the image display section is implemented as a display section of the camcorder or provided in a portable display device or a household large-screen TV set. In FIG. 25, like elements to those of FIG. 22 are denoted by like reference numerals and will not be further described below. The configuration of FIG. 25 differs from that of FIG. 22 in that the multi-pixel-resolution compressed video data DMC is received as the input, and the configuration accordingly includes a compressed video data separation section 402 for separating the input multi-pixel-resolution compressed video data DMC into the differential video data DF(t) and the low-resolution video data LF(t). Moreover, the configuration includes a high-resolution window producing section 403, a high-resolution component synthesizing section 404 and a synthesis ratio determining section 405.

Receiving a command from the overall control section 306, the compressed video data separation section 402 separates and expands the multi-pixel-resolution compressed video data DMC to thereby obtain the low-resolution video data LF(t) and the differential video data DF(t). As in FIG. 22, the low-resolution video data LF(t) is processed by the image size correction/texture conversion section 302, the texture replacing section 303 and the texture inverse conversion section 304 to be converted to a high-resolution image HF(t). Note however that the high-resolution image HF(t) is produced based only on the low-resolution video data LF(t), and displaying the high-resolution image HF(t) as it is on the display 307 means not taking advantage of the method in which the multi-pixel-resolution recorded video F(t) is recorded.

In order to user the recorded original high-resolution image, the high-resolution window producing section 403 obtains the original multi-pixel-resolution recorded video F(t) by using the differential video data DF(t) and the low-resolution video data LF(t), and outputs the high-resolution image HWF(t) in the window region. Then, using the high-resolution images HF(t) and HWF(t), the high-resolution component synthesizing section 404 performs a weighted synthesis process with a synthesis ratio m (m=0 to 1) determined by the synthesis ratio determining section 405, to thereby output high-resolution video data HHF(t) to be displayed on the display 307. The weighted synthesis process is performed for the window region, and the high-resolution image HF(t) obtained by texture replacing process is used as it is outside the window region.

$$HHF(t)=m \times HWF(t)+(1-m) \times HF(t) \qquad \text{Exp. 4}$$

The overall control section 306 can change the synthesis ratio m by sending the synthesis ratio determining section 405 a signal that determines the synthesis ratio m. Thus, it is possible to reduce the difference between the image in the window region where the weighted synthesis process is performed and the image outside the window region to a level such that the combined image does not seem awkward.

Fourth Embodiment

It is assumed in the third embodiment that the process of learning the resolution increasing parameter is performed in a camcorder during the video recording process. In contrast, in the present embodiment, the process of learning the resolution increasing parameter is not performed during the video recording process, but is performed by a server on a network or by a display device. This reduces the processing load on the camera, and the display section can perform the resolution increasing process with a high degree of freedom while learning the resolution increasing parameter based on the recorded video data.

Figure 26:
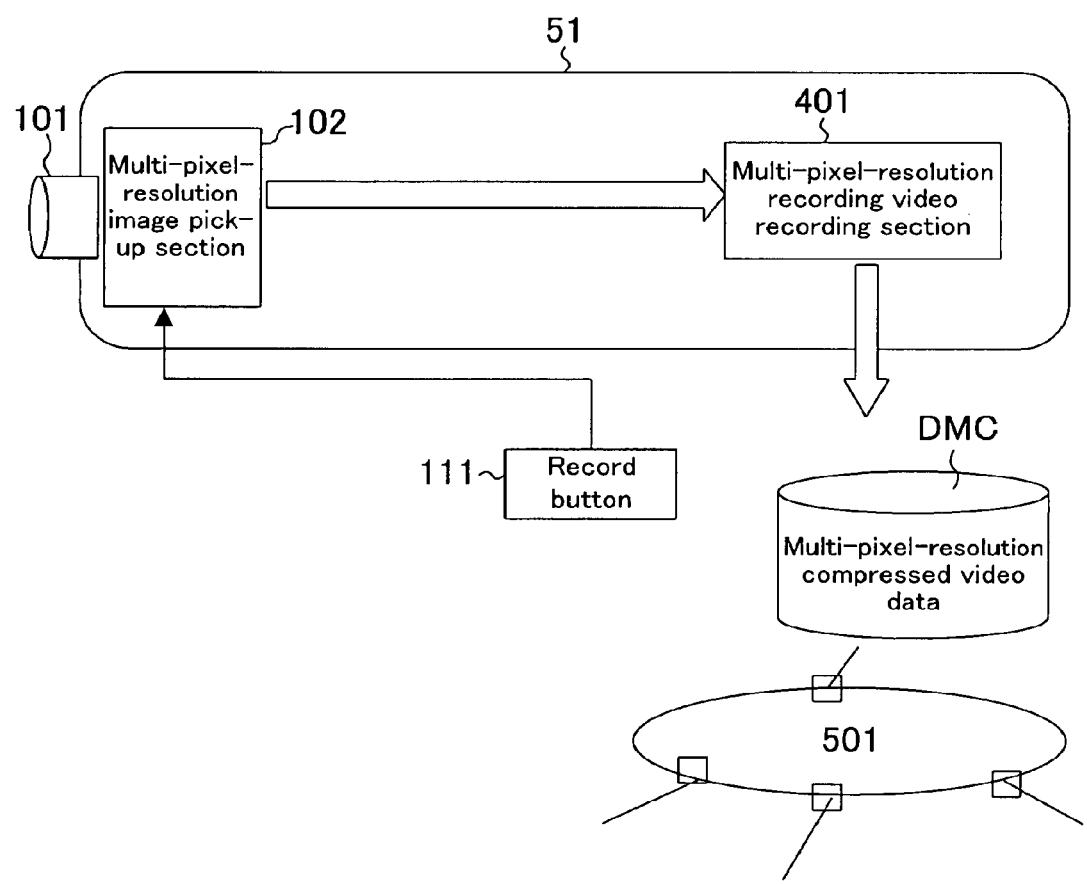
FIG. 26 shows an exemplary configuration of an image processing device according to a fourth embodiment of the present invention.

FIG. 26 is a block diagram showing an exemplary configuration of an image processing device of the present embodiment, wherein the present invention is applied to a camcorder. In FIG. 26, like elements to those of FIG. 23 are denoted by like reference numerals and will not be further described below. As compared with the configuration of FIG. 23, an image processing device 51 of FIG. 26 is not provided with a section for learning the resolution increasing parameter, whereby the output from the multi-pixel-resolution image pick-up section 102 is simply recorded as the multi-pixel-resolution compressed video data DMC. The video data DMC may be recorded on a medium such as a hard disk, or sent out to a video processing server or an image display section to be described later via a network 501.

Figure 27:
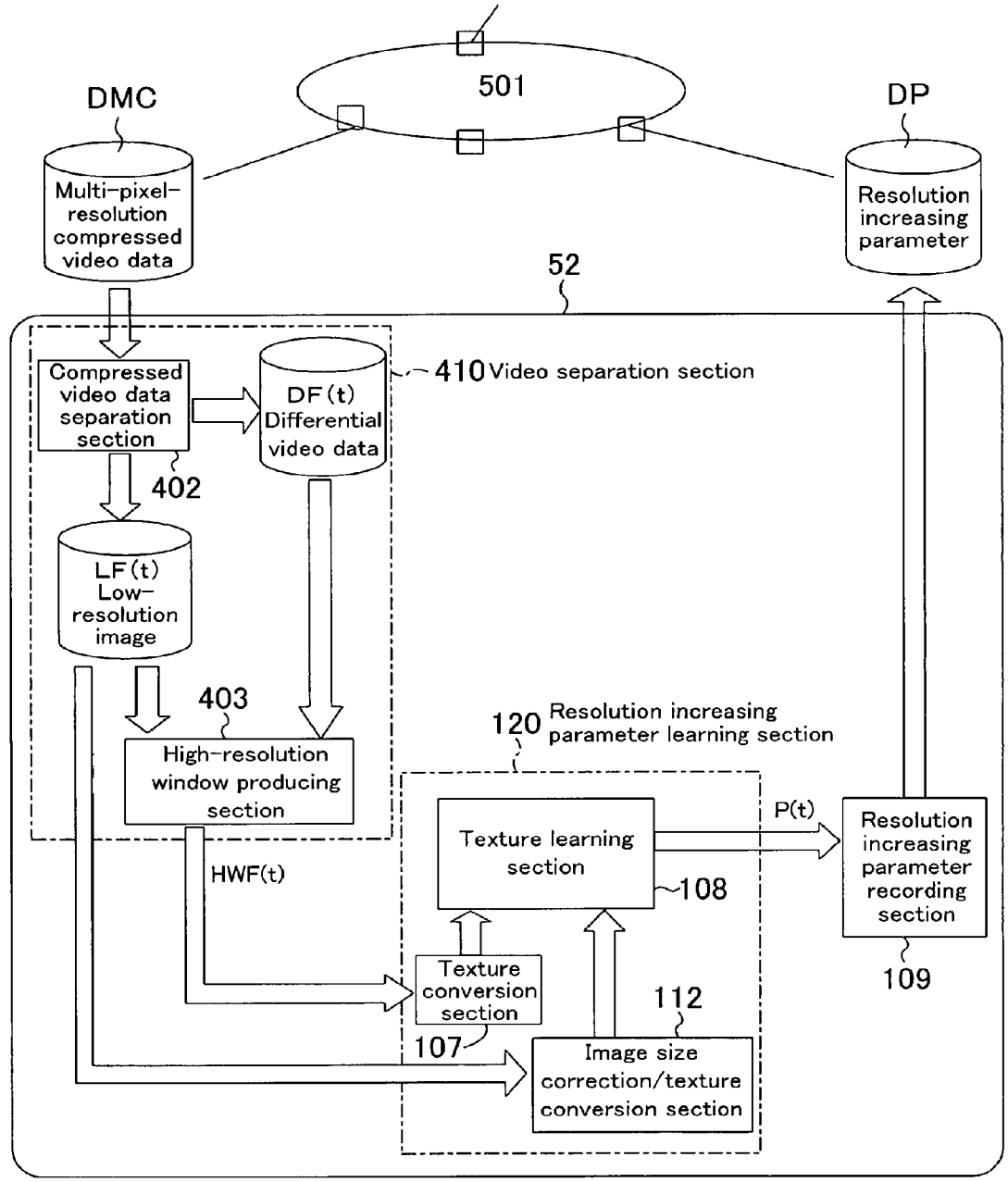
FIG. 27 shows a configuration of a video processing server according to the fourth embodiment of the present invention.

FIG. 27 is a block diagram showing the configuration of the video processing server of the present embodiment. In FIG. 27, like elements to those of FIGS. 23 and 25 are denoted by like reference numerals and will not be further described below. A video processing server 52 of FIG. 27 produces the resolution increasing parameter DP from the multi-pixel-resolution compressed video data DMC. The compressed video data separation section 402 and the high-resolution window producing section 403 together form a video separation section 410.

As shown in FIG. 27, the compressed video data separation section 402 separates and expands the multi-pixel-resolution compressed video data DMC to thereby obtain the low-resolution video data LF(t) and the differential video data DF(t). The high-resolution window producing section 403 obtains the original multi-pixel-resolution recorded video data F(t) from the low-resolution video data LF(t) and the differential video data DF(t), and outputs the high-resolution image HWF(t) in the window region. The resolution increasing parameter learning section 120 obtains the resolution increasing parameter P(t) from the high-resolution image HWF(t) and the low-resolution video data LF(t). The resolution increasing parameter recording section 109 stores the resolution increasing parameter P(t) as the resolution increasing parameter DP, or sends it out to the network 501.

In the present embodiment, the high-resolution image is displayed by a configuration as shown in FIG. 25 as in the third embodiment, and the process will therefore not be further described below.

It is assumed in the present embodiment that the function of learning the resolution increasing parameter is realized by the video processing server. Therefore, the function of separating and expanding video data needs to be provided also in the video processing server separately from the display section. Alternatively, this may be realized by a configuration obtained by combining together the video processing server of FIG. 27 and the image display section of FIG. 25. Then, the function of separating and expanding video data can be shared by the process of learning the resolution increasing parameter and the process of displaying the high-resolution image.

Fifth Embodiment

Figure 28:
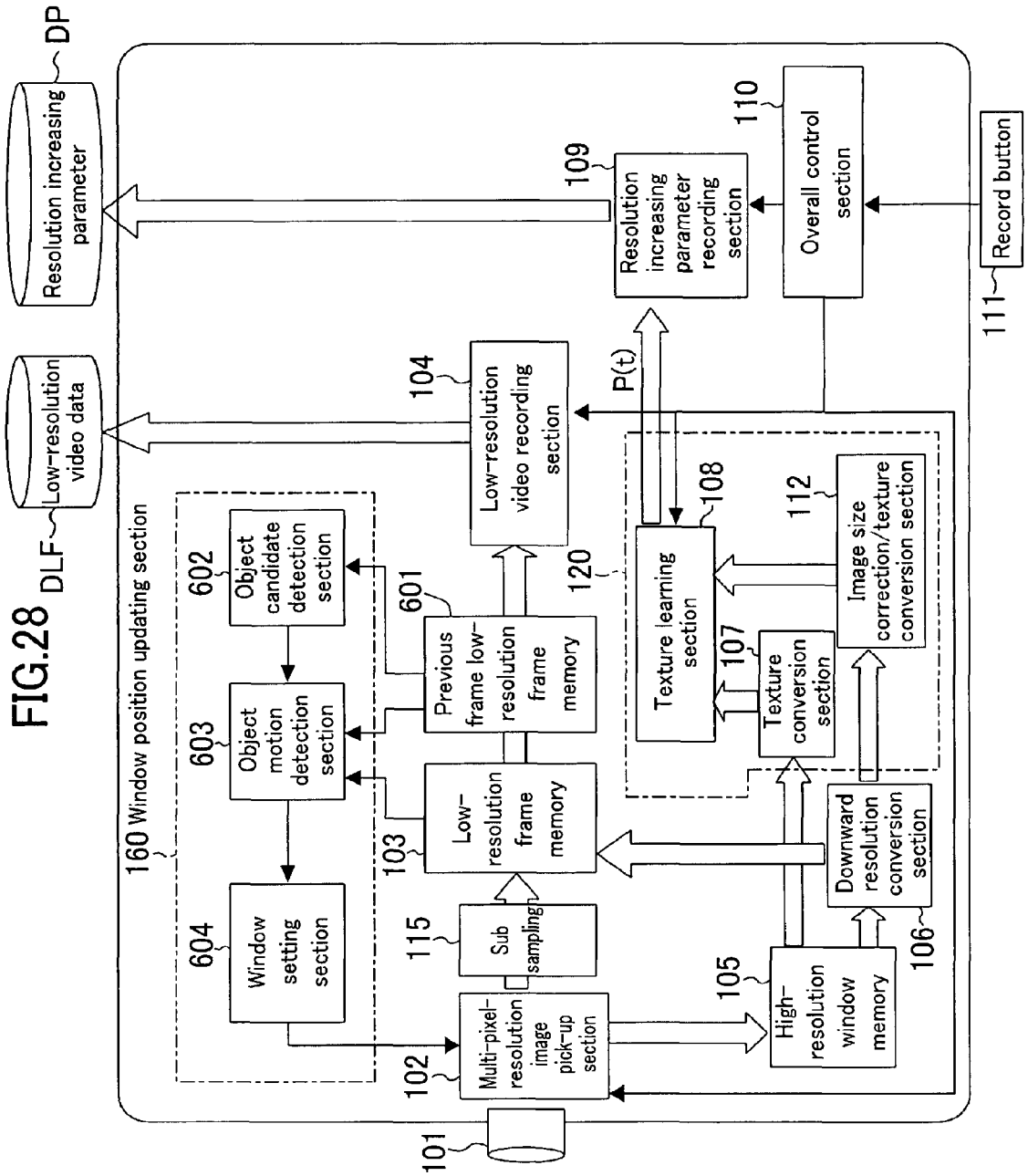
FIG. 28 shows a configuration of an image processing device according to a fifth embodiment of the present invention.

FIG. 28 is a block diagram showing an exemplary configuration of an image processing device according to a fifth embodiment of the present invention, wherein the present invention is applied to a camcorder. The configuration of FIG. 28 is an improvement to that of FIG. 8 according to the second embodiment. In FIG. 28, like elements to those of FIG. 8 are denoted by like reference numerals and will not be further described below.

In the present embodiment, the position of the window region in which a high-resolution image is obtained is changed so as to follow the motion of the object instead of simply shifting the window region from one position to another over time. Thus, the process can learn the resolution increasing parameter in a concentrated manner in the region that does not move out of the position of the object being the focus of attention, whereby it is possible to improve the precision of the resolution increasing process. The object candidate region can be detected by analyzing the frequency components of the image. For example, the process can define, as an object candidate region, a region that contains the most spatial high-frequency components.

As compared with that of FIG. 8, the configuration of FIG. 28 additionally includes a previous frame low-resolution frame memory 601, and a window position updating section 160 for detecting the motion of the object candidate region in the low-resolution video data and moving the position of the window region according to the detected motion of the object candidate region. The window position updating section 160 includes an object candidate detection section 602, an object motion detection section 603 and a window setting section 604.

The object candidate detection section 602 performs an image filtering process for saving high-frequency components on the low-resolution image stored in the previous frame low-resolution frame memory 601, and detects a region having a high frequency power as the object candidate region. Using the low-resolution image at current time t stored in the low-resolution frame memory 103 and the low-resolution image at time t−1 stored in the previous frame low-resolution frame memory 601, the object motion detection section 603 performs a block matching process for the object candidate region detected by an object candidate detection section 604 to thereby detect a motion vector. The window setting section 604 sets a window region based on the motion vector detected by the object motion detection section 603.

FIGS. 29A to 29D show the process of detecting an object candidate region. The input image of FIG. 29A is subjected to an edge detection process and a mosaic process to obtain an image of FIG. 29B in which the degree of frequency power concentration is represented by the shade. Each region of the image of FIG. 29B that includes a position with the darkest shade is selected as a block, and the process selects an object candidate region as shown in FIG. 29C taking into consideration how the blocks are connected to one another. In the illustrated example, the process sets the window region as shown in FIG. 29D so that the object candidate region is included. While the window region is of an 8×2 rectangular shape in the illustrated example, the window region may be of any appropriate shape depending on the configuration of the multi-pixel-resolution image pick-up device.

For the obtained object candidate region, the process calculates the motion vector by using a block matching method between consecutive frames. Then, based on the obtained motion vector, the process shifts the position of the window region to set the new position thereof for the next point in time t+1. Thus, the process moves the window region where the high-resolution image is obtained so as to follow the motion of the object being the focus of attention.

Figure 30:
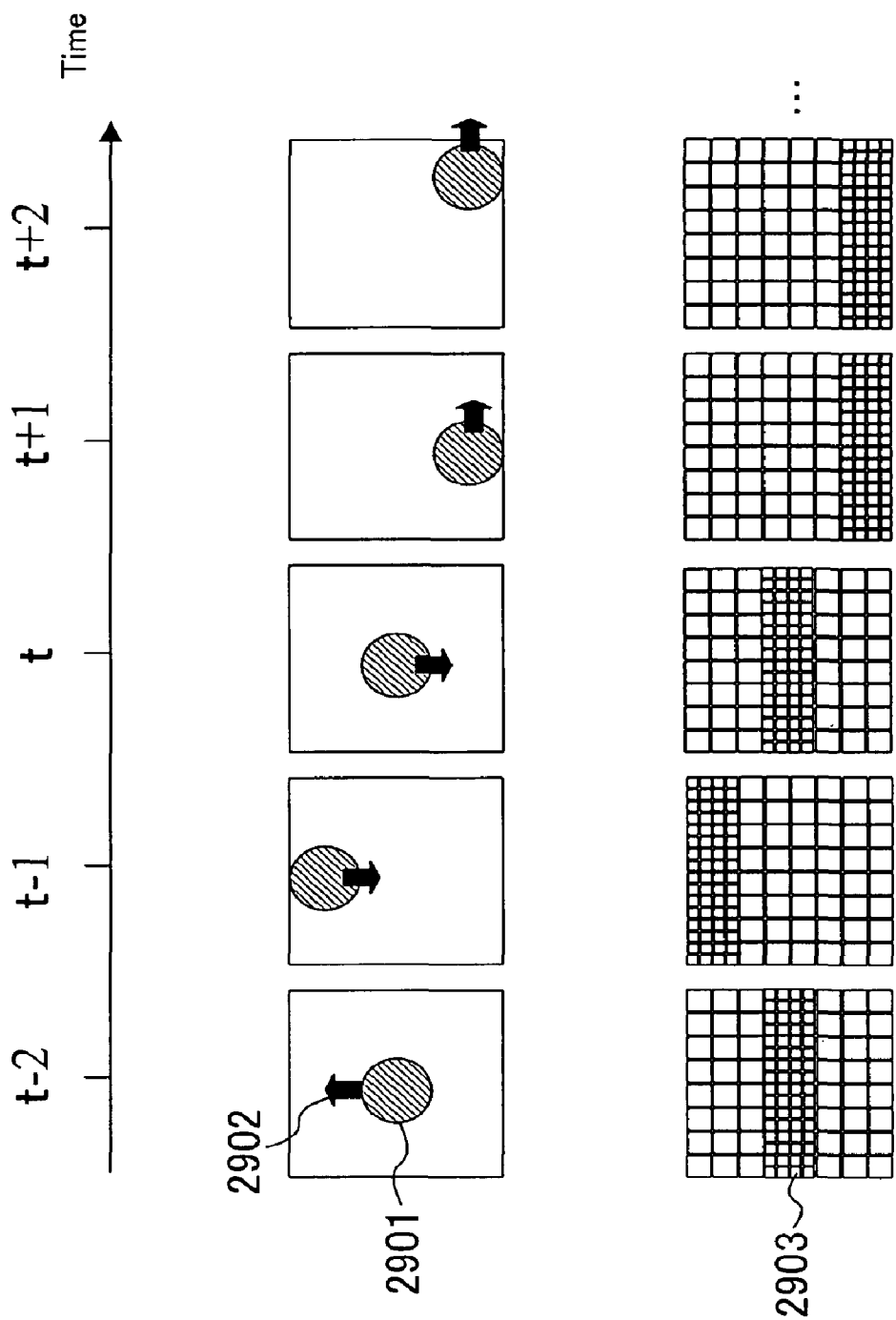
FIG. 30 shows an example of how to set a window region according to the fifth embodiment of the present invention.

FIG. 30 shows an example of how to set a window region in the present embodiment. In FIG. 30, the shape of a window region 2903 is a horizontal rectangular shape as in FIG. 3. An object 2901 moves around in the screen over time, and the process detects in each frame a motion vector 2902 representing the motion of the object 2901. The window region 2903 is moved over time according to the motion of the object in the vertical (V) direction. The position of the window region 2903 does not have to follow the order of scan as in FIG. 3, or may not be continuous between adjacent frames. With the configuration of the multi-pixel-resolution image pick-up section of FIG. 12, the window region can be moved in any manner in the vertical (V) direction by changing the output pulse from the progressive scanning shift register 206. With respect to the horizontal (H) direction, the window region may be made into any shape by discarding unnecessary pixels.

Sixth Embodiment

Figure 31:
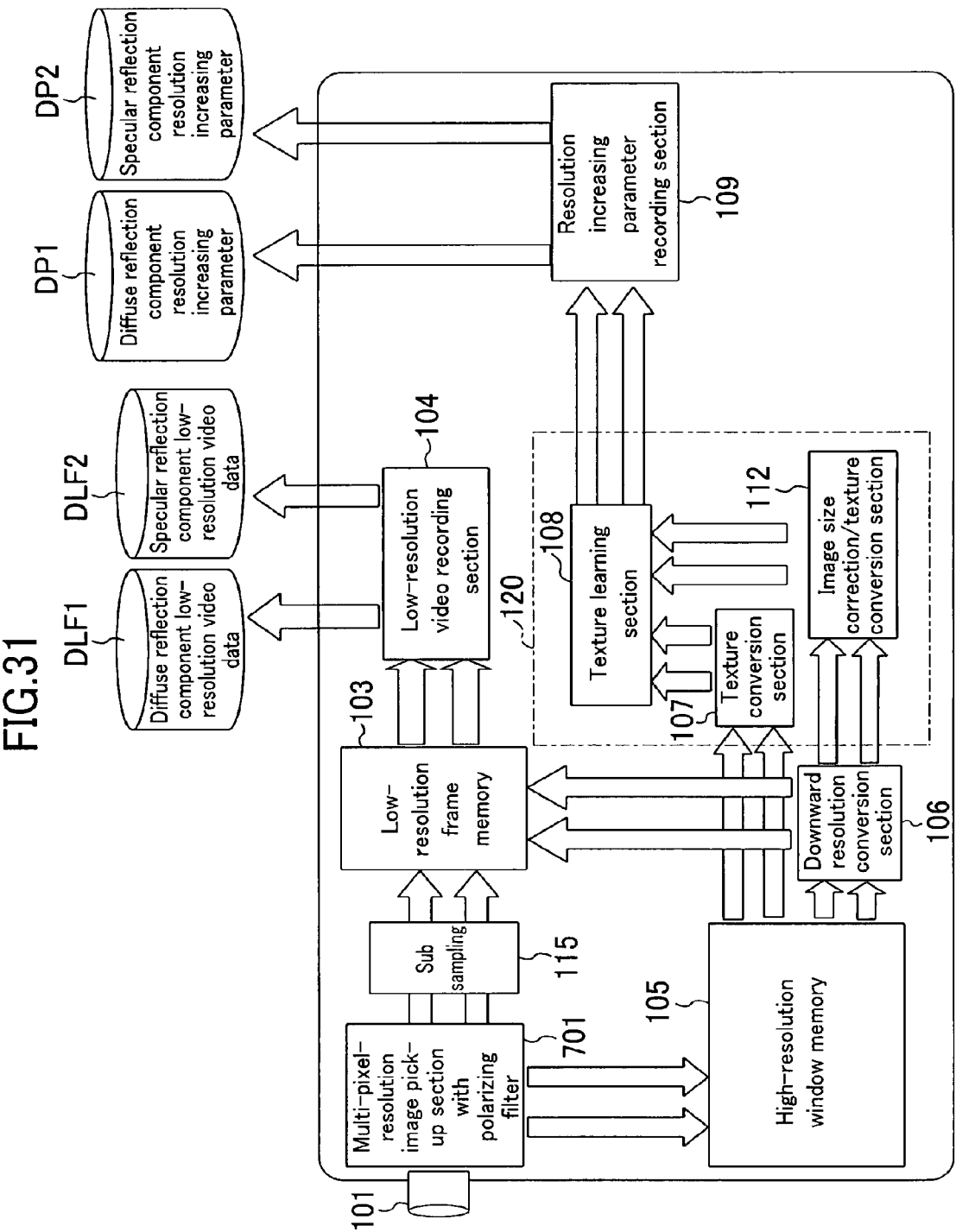
FIG. 31 shows a configuration of an image processing device according to a sixth embodiment of the present invention.

FIG. 31 is a block diagram showing an exemplary configuration of an image processing device according to a sixth embodiment of the present invention, wherein the present invention is applied to a camcorder. The configuration of FIG. 31 is an improvement to that of FIG. 8 according to the second embodiment. In FIG. 31, like elements to those of FIG. 8 are denoted by like reference numerals and will not be further described below.

In the present embodiment, the low-resolution video data and the resolution increasing parameter are obtained separately for the diffuse reflection component and for the specular reflection component. Specifically, the low-resolution video recording section 104 separately records diffuse reflection component low-resolution video data DLF1 and specular reflection component low-resolution video data DLF2, and the resolution increasing parameter recording section 109 separately records a diffuse reflection component resolution increasing parameter DP1 and a specular reflection component resolution increasing parameter DP2. Moreover, a multi-pixel-resolution image pick-up section 701 with a polarizing filter is provided instead of the multi-pixel-resolution image pick-up section 102 of FIG. 8.

Specifically, the present embodiment uses four image pick-up devices, instead of an ordinary three-chip configuration for color recording, to separately record the specular reflection component of the object and the diffuse reflection component thereof and to separately subject the components to the resolution increasing process, to finally combine the images together. The physical reflection optical characteristics of the object can be obtained by splitting the specular reflection component and the diffuse reflection component from the surface luminance. As a result, it is possible to separately obtain the surface roughness of the object and the reflectivity inherent to the material such as the albedo of the surface. Therefore, it is very effective in improving the texture of the surface of the object. In view of this, it is expected that the texture of the surface of the object can be further improved by performing the resolution increasing process separately for the specular reflection component and for the diffuse reflection component.

While there are various methods for separating the specular reflection component and the diffuse reflection component from each other, the present embodiment employs a method in which a polarizing plate is provided in front of a camera lens and the components are separated from each other from only two images that are obtained with the polarization axis being shifted from each other, wherein there are no special lighting conditions. The method is described in detailed in, for example, Shinji Umeyama "Separation of diffuse and specular components of surface reflection—using multiple observations through a polarizer and probabilistic independence property", Meeting on Image Recognition and Understanding (MIRU2002) (pages 1-469 to 476). Therefore, the details of the process will not be discussed below, but only the configuration of the image pick-up section will be described.

Figure 32:
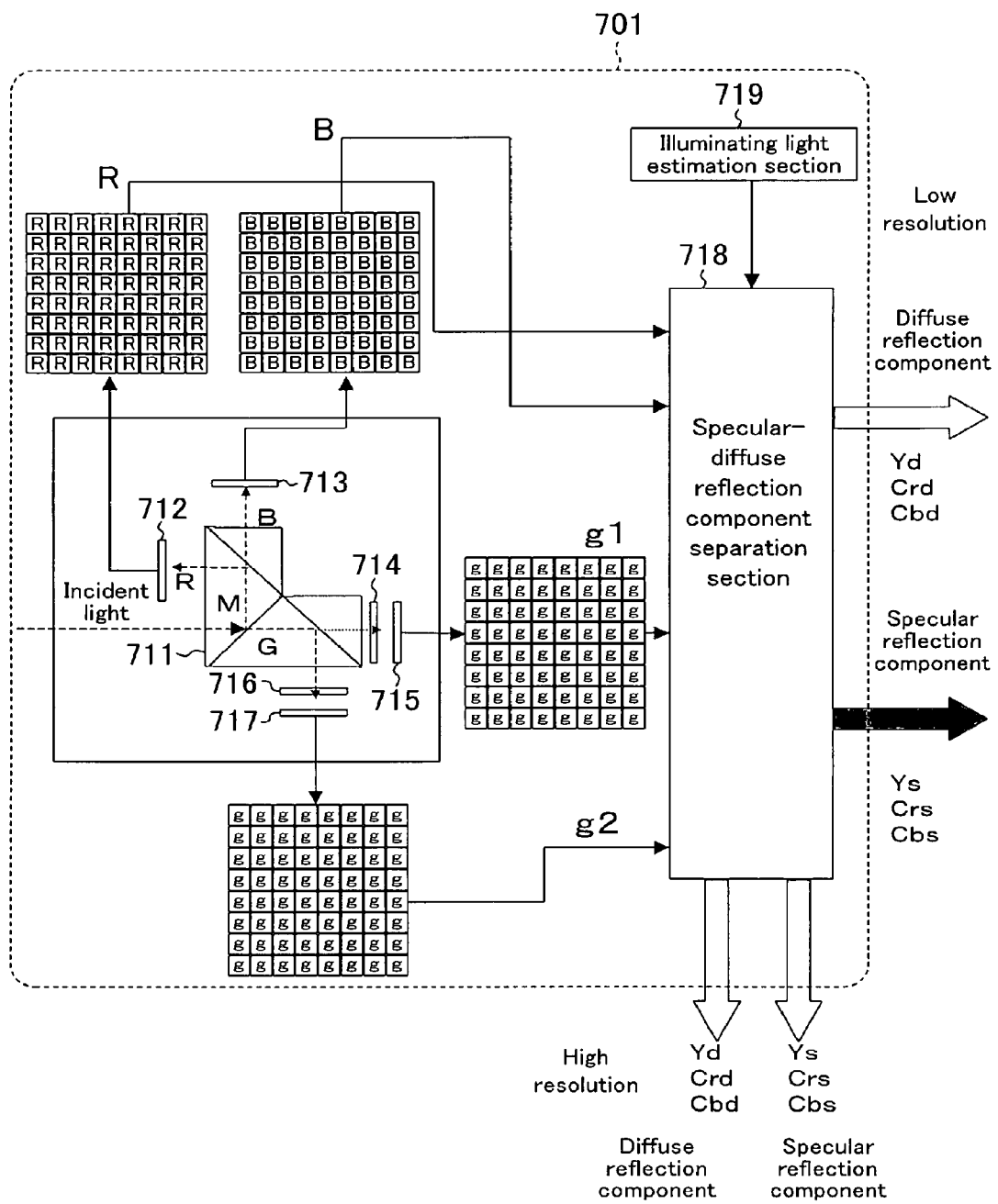
FIG. 32 shows a configuration of a multi-pixel-resolution image pick-up section with a polarizing filter shown in FIG. 31.

FIG. 32 shows a configuration of the multi-pixel-resolution image pick-up section 701 with a polarizing filter. As shown in FIG. 32, the multi-pixel-resolution image pick-up section 701 with a polarizing filter includes a four-way beam splitting prism 711, a red multi-pixel-resolution image pick-up device 712, a blue multi-pixel-resolution image pick-up device 713, a first polarizing plate 714, a first green multi-pixel-resolution image pick-up device 715, a second polarizing plate 716, a second green multi-pixel-resolution image pick-up device 717, a specular-diffuse reflection component separation section 718, and an illuminating light estimation section 719. With this configuration, a multi-pixel-resolution image pick-up device of a wide dynamic range is preferably used in order to obtain a specular reflection component of a very high contrast.

A multilayer film interference filter, or the like, is sandwiched at the interface of the four-way beam splitting prism 711. The incident light is split by a first interface reflection into G (green) light and M (magenta) light, and the M light is split by a second reflection into R (red) light and B (blue) light, which are guided to the red multi-pixel-resolution image pick-up device 712 and the blue multi-pixel-resolution image pick-up device 713, respectively. The G light is split by the second reflection into g1 light, which passes through the first polarizing plate 714 and enters the first green multi-pixel-resolution image pick-up device 715, and g2 light, which passes through the second polarizing plate 716 and enters the second green multi-pixel-resolution image pick-up device 717. While each of the first polarizing plate 714 and the second polarizing plate 716 passes only the polarization primary axis component, the polarization axes thereof are shifted from each other, whereby different images are obtained by the first green multi-pixel-resolution image pick-up device 715 and the second green multi-pixel-resolution image pick-up device 717. The g1 light and the g2 light, which have passed through the polarizing plate, are different light from the original G light.

The g1 light and the g2 light are converted by the specular-diffuse reflection component separation section 718 into the specular component Gs and the diffuse component Gd of the original G light. Gs and Gd are in the following relationship.

$$G = Gs + Gd \qquad \text{Exp. 5}$$

The illuminating light estimation section 719 obtains information regarding the light illuminating the object, by using an AWB (auto white balance) function, or the like, which is provided in ordinary cameras. With an object with which a dichromatic reflection model holds, the specular reflection component Gs is nothing but the G component of the illuminating light. Therefore, where the illuminating light estimation section 719 estimates the color component ratio (R:G:B) of the illumination (RIL:1:BIL) with G being 1, the specular reflection components Rs and Bs of red R and blue B can be estimated as follows as the red R component and the blue B component of the illuminating light.

$$Rs = RIL \cdot Gs$$

$$Bs = BIL \cdot Gs \qquad \text{Exp. 6}$$

Using these, the R light and the B light can also be split into the specular reflection component and the diffuse reflection component as follows.

$$R = Rs + Rd$$

$$B = Bs + Bd \qquad \text{Exp. 7}$$

As described above, it is possible to estimate the diffuse reflection component and the specular reflection component for all of R, G and B. Therefore, these reflection components can be converted by an ordinary matrix operation into a diffuse reflection component luminance-color difference space (Yd,Crd,Cbd) and a specular reflection component luminance-color difference space (Ys,Crs,Cbs).

Therefore, with the configuration of FIG. 31, there are obtained two types of video data, i.e., the diffuse reflection component low-resolution video data DLF1 and the specular reflection component low-resolution video data DLF2, and two types of resolution increasing parameters, i.e., the diffuse reflection component resolution increasing parameter DP1 and the specular reflection component resolution increasing parameter DP2.

Normally, when a Y signal is split into a diffuse reflection component Yd and a specular reflection component Ys, multi-pixel-resolution recording needs to be performed while splitting each of the RGB primary color signals into a specular reflection component and a diffuse reflection component, which requires six image pick-up devices. However, the present embodiment, which uses the illuminating light estimation section 719, can be realized with four image pick-up devices.

Figure 33:
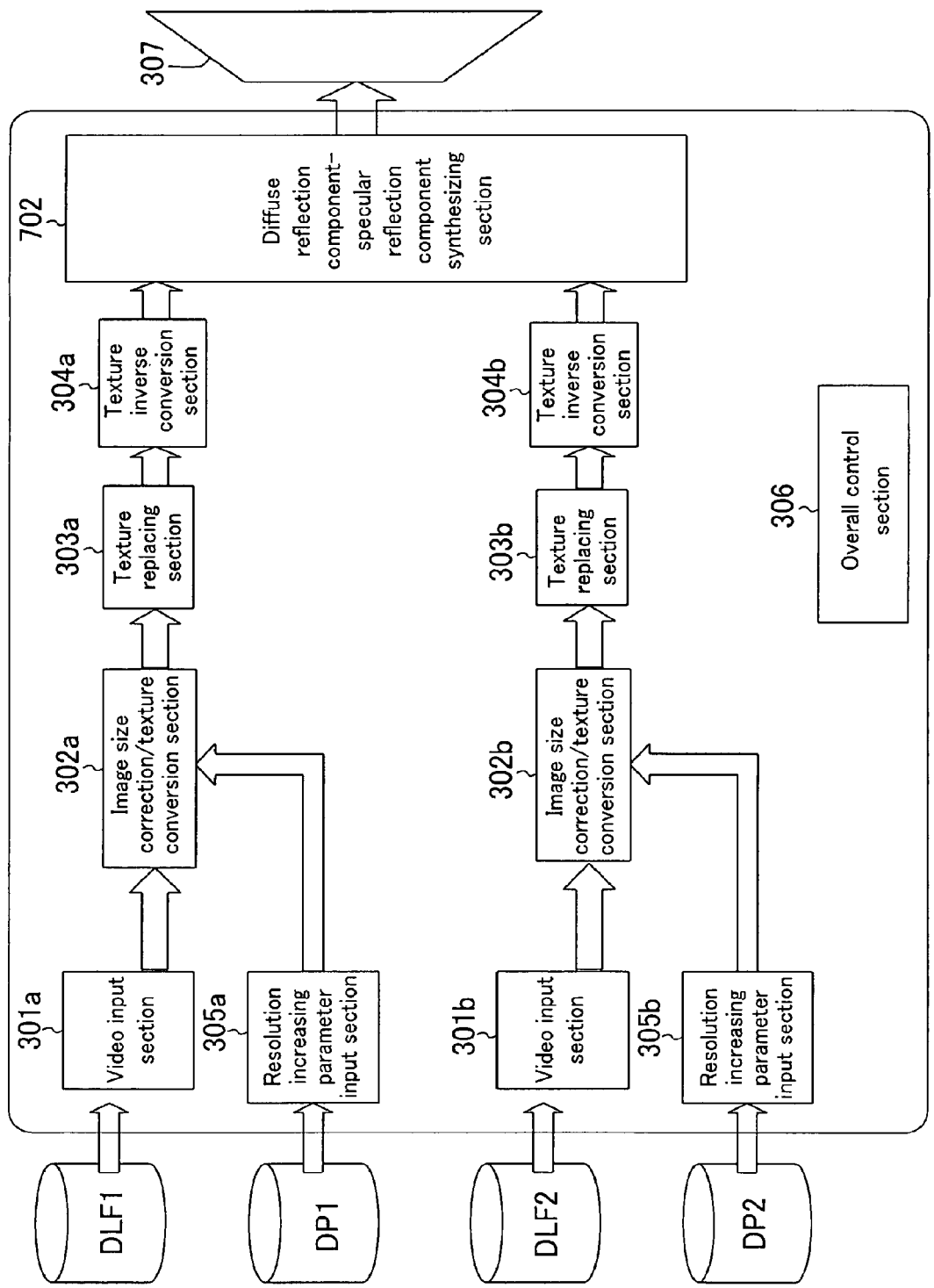
FIG. 33 shows a configuration of an image display section according to the sixth embodiment of the present invention.

FIG. 33 shows a configuration of an image display section of the present embodiment. The configuration of FIG. 33 has a function of displaying, with a high resolution, video data recorded by an image processing device such as a camcorder of FIG. 31. For example, the image display section is implemented as a display section of the camcorder or provided in a portable display device or a household large-screen TV set.

The second embodiment differs from the configuration of FIG. 22 in that the resolution increasing process is realized separately for the diffuse reflection component and the specular reflection component, after which a diffuse reflection component-specular reflection component synthesizing section 702 synthesizes the specular reflection component and the diffuse reflection component in terms of the luminance and the color difference level. The synthesis process may be performed either in the luminance-color difference YCrCb space obtained by inverse conversion from texture or in the primary color RGB space. Video input sections 301a and 301b operate as does the video input section 301 of FIG. 22. Moreover, image size correction/texture conversion sections 302a and 302b, texture replacing sections 303a and 303b, texture inverse conversion sections 304a and 304b and resolution increasing parameter input sections 305a and 305b operate as do the image size correction/texture conversion section 302, the texture replacing section 303, the texture inverse conversion section 304 and the resolution increasing parameter input section 305 of FIG. 22, respectively.

It is considered in the present embodiment that the diffuse reflection component and the specular reflection component are separate and independent signals, and each of them is subjected to the resolution increasing process separately. Therefore, the present embodiment can be combined with the second to fifth embodiments described above. Moreover, the diffuse reflection component low-resolution video data DLF1 and the specular reflection component low-resolution video data DLF2 may be combined together and stored as a single image format.

In the present embodiment, the resolution increasing process for the diffuse reflection component and that for the specular reflection component are performed by the same method. However, they do not need to be performed by the same method, but may alternatively be performed by different methods. For example, an interpolating enlargement method known in the art may be used only for the diffuse reflection component.

Moreover, it may not be necessary to subject both of the diffuse reflection component and the specular reflection component to the resolution increasing process. Where only one of the diffuse reflection component and the specular reflection component is subjected to the resolution increasing process, the selection between the two components can be made based on the characteristics of the object, the light source environments used for recording, the purpose of the resolution increasing process, etc. For example, the specular reflection component may be selected in order to emphasize the irregularities of the surface of a craft product or an object subjected to a special surface treatment, and the diffuse reflection component may be selected in order to faithfully reproduce text printed on the surface of the object.

Figure 34:
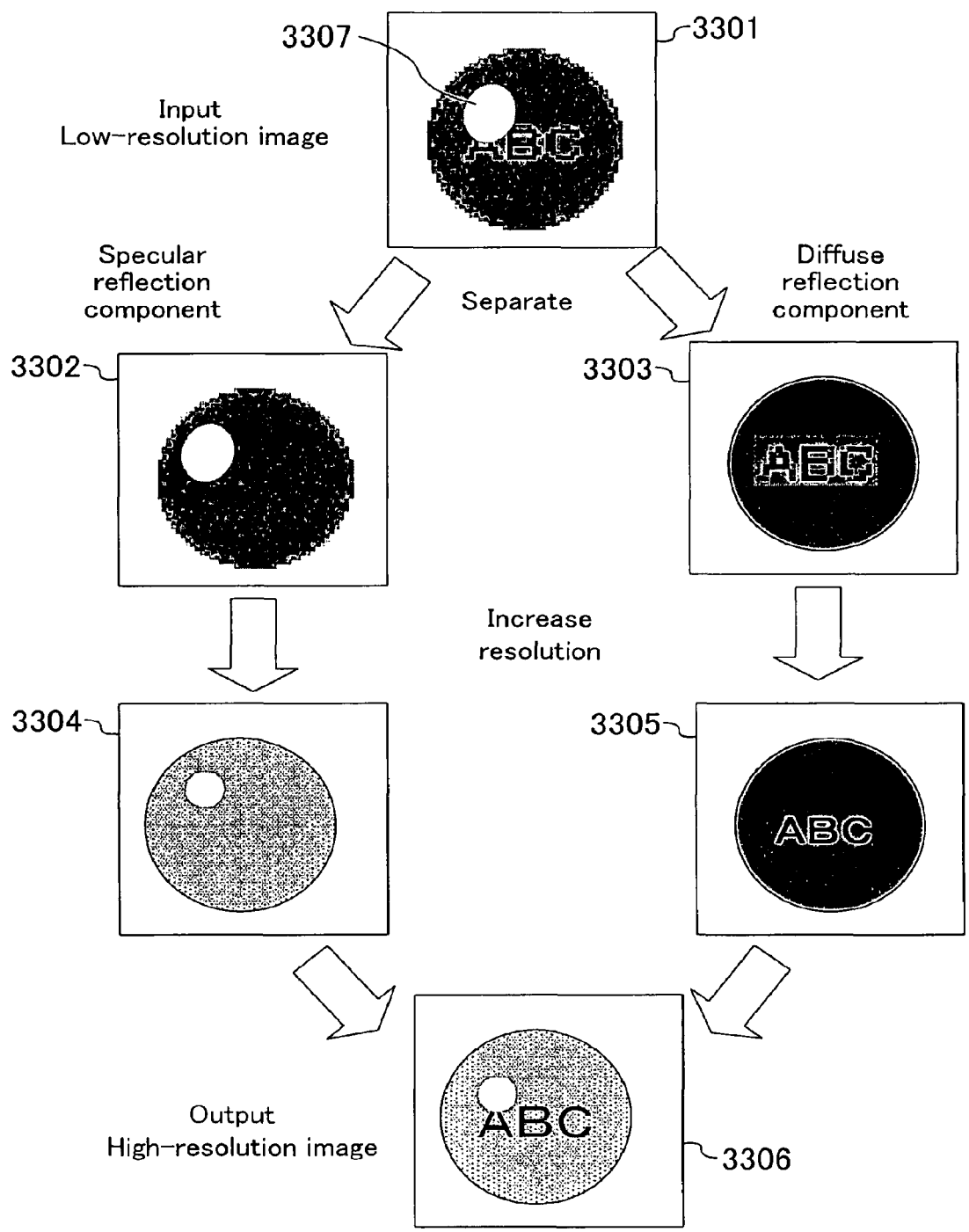
FIG. 34 shows an effect of a resolution increasing process according to the sixth embodiment of the present invention.

FIG. 34 schematically shows a resolution increasing process of the present embodiment. Assume a spherical object with surface irregularities and with text "ABC" printed thereon. Referring to FIG. 34, an input low-resolution image 3301 has a highlight 3307 over the text due to specular reflection of light. This can be split into a specular reflection component 3302 and a diffuse reflection component 3303, wherein the text portion being a result of diffuse reflection disappears in the specular reflection component 3302, whereas the highlight portion and the surface irregularity disappear in the diffuse reflection component 3303. Then, as the specular reflection component 3302 is subjected to the resolution increasing process, there is produced an image 3304 in which the surface irregularity and the specular reflection component have been resolution-increased with the text portion remaining disappeared. As the diffuse reflection component 3303 is subjected to the resolution increasing process, there is produced an image 3305 in which only the text is resolution-increased while the specular reflection and the highlight disappear. From the images 3304 and 3305, it is possible to produce as an output image a high-resolution image 3306. The image 3306 carries a larger amount of information and is visually a better result as compared with a case where an original image is subjected to the resolution increasing process as it is without splitting the original image into a diffuse reflection component and a specular reflection component.

The present invention realizes, with a small amount of information processing, a high-precision resolution conversion in which object characteristics are reflected in the resultant image, and is therefore effective in producing digital high-resolution video data with rich texture in various applications where the amount of visual information valued highly, for example. Moreover, the present invention is also effective in displaying an image on a low-resolution display system such as a mobile telephone, for example.

What is claimed is:

1. An image processing device, comprising:
   a multi-pixel-resolution image pick-up section for obtaining multi-pixel-resolution video data by taking an image with a high resolution in a window region being a portion of an entire image and whose position changes every frame while taking an image with a low resolution outside the window region;
   a downward resolution conversion section for performing an image filtering process on the high-resolution image in the window region to decrease a resolution of the high-resolution image;
   a low-resolution video recording section for recording low-resolution video data obtained from an output of the downward resolution conversion section and the multi-pixel-resolution video data;
   a resolution increasing parameter learning section for learning a resolution increasing parameter by using the high-resolution image in the window region and the output of the downward resolution conversion section; and
   a resolution increasing parameter recording section for recording the resolution increasing parameter.

2. The image processing device of claim 1, wherein the multi-pixel-resolution image pick-up section obtains the multi-pixel-resolution video data while the multi-pixel-resolution video data is split into a luminance component and a color difference component.

3. The image processing device of claim 1, further comprising a record button, wherein when the record button is pressed, the multi-pixel-resolution image pick-up section records an image, and the low-resolution video data and the resolution increasing parameter are recorded.

4. The image processing device of claim 1, further comprising a window position updating section for detecting a motion of an object candidate region in the low-resolution video data and moving a position of the window region according to the detected motion of the object candidate region.

5. The image processing device of claim 4, wherein the window position updating section detects the object candidate region based on a frequency analysis of an image.

6. The image processing device of claim 1, wherein the multi-pixel-resolution image pick-up section obtains the multi-pixel-resolution video data while the multi-pixel-resolution video data is split into a diffuse reflection component and a specular reflection component.

7. The image processing device of claim 6, wherein the multi-pixel-resolution image pick-up section splits a taken color image into a plurality of primary color components and splits one of the primary color components into a specular reflection component and a diffuse reflection component, and wherein a diffuse reflection component and a specular reflection component of the color image are obtained by using the obtained specular reflection component and diffuse reflection component.

8. The image processing device of claim 6, wherein the multi-pixel-resolution image pick-up section estimates illuminating light used for recording, and the specular reflection component is obtained by using the estimated illuminating light.

9. An image processing device for performing a resolution increasing process by using the low-resolution video data and the resolution increasing parameter recorded by the image processing device of claim 1, the image processing device comprising:
- a video input section for reading the low-resolution video data;
- a resolution increasing parameter input section for reading the resolution increasing parameter; and
- a resolution increasing section for increasing a resolution of the low-resolution video data read by the video input section by using the resolution increasing parameter read by the resolution increasing parameter input section.

10. An image processing device, comprising:
- a multi-pixel-resolution image pick-up section for obtaining multi-pixel-resolution video data by taking an image with a high resolution in a window region being a portion of an entire image and whose position changes every frame while taking an image with a low resolution outside the window region;
- a downward resolution conversion section for performing an image filtering process on the high-resolution image in the window region to decrease a resolution of the high-resolution image;
- a multi-pixel-resolution video recording section for recording the multi-pixel-resolution video data;
- a resolution increasing parameter learning section for learning a resolution increasing parameter by using the high-resolution image in the window region and the output of the downward resolution conversion section; and
- a resolution increasing parameter recording section for recording the resolution increasing parameter.

11. The image processing device of claim 10, wherein the multi-pixel-resolution video recording section records the multi-pixel-resolution video data while the multi-pixel-resolution video data is split into low-resolution video data and differential video data representing a difference between the multi-pixel-resolution video data and the low-resolution video data.

12. An image processing device, comprising:
- a multi-pixel-resolution image pick-up section for obtaining multi-pixel-resolution video data by taking an image with a high resolution in a window region being a portion of an entire image and whose position changes every frame while taking an image with a low resolution outside the window region; and
- a multi-pixel-resolution video recording section for recording the multi-pixel-resolution video data while the multi-pixel-resolution video data is split into low-resolution video data and differential video data representing a difference between the multi-pixel-resolution video data and the low-resolution video data.

13. An image processing device for obtaining a resolution increasing parameter by using multi-pixel-resolution video data recorded by another image processing device comprising a) a multi-pixel-resolution image pick-up section for obtaining multi-pixel-resolution video data by taking an image with a high resolution in a window region being a portion of an entire image and whose position changes every frame while taking an image with a low resolution outside the window region and b) a multi-pixel-resolution video recording section for recording the multi-pixel-resolution video data while the multi-pixel-resolution video data is split into low-resolution video data and differential video data representing a difference between the multi-pixel-resolution video data and the low-resolution video data, the image processing device comprising:
- a video separation section for reading the multi-pixel-resolution video data and separating the low-resolution video data therefrom and for obtaining the high-resolution image in the window region by using the differential video data;
- a resolution increasing parameter learning section for learning a resolution increasing parameter by using the high-resolution image in the window region and the low-resolution video data; and
- a resolution increasing parameter recording section for recording the resolution increasing parameter.

* * * * *